(12) United States Patent
Kim et al.

(10) Patent No.: US 9,647,888 B2
(45) Date of Patent: *May 9, 2017

(54) NETWORK ADDRESSABLE APPLIANCE INTERFACE DEVICE

(71) Applicant: Belkin International, Inc., Playa Vista, CA (US)

(72) Inventors: Ryan Yong Kim, Rolling Hills Estates, CA (US); Venkata Subba Rao Pathuri, Alpharetta, GA (US); Francis Michael Kelly, Thousand Oaks, CA (US); David Allen Glawson, Torrance, CA (US); Jason Lynn Whitney, Playa Vista, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,066

(22) Filed: May 30, 2014

(65) Prior Publication Data
US 2015/0350008 A1 Dec. 3, 2015

(51) Int. Cl.
H04Q 5/22 (2006.01)
H04L 12/24 (2006.01)
(Continued)

(52) U.S. Cl.
CPC .......... *H04L 41/082* (2013.01); *H04L 12/281* (2013.01); *H04L 12/2816* (2013.01);
(Continued)

(58) Field of Classification Search
CPC . H04L 12/281; H04L 12/282; H04M 1/72533
See application file for complete search history.

(56) References Cited

U.S. PATENT DOCUMENTS 6,005,476 A 12/1999 Valiulis
9,000,896 B1 4/2015 Kim et al.
(Continued)

FOREIGN PATENT DOCUMENTS

WO 01/26288 A1 4/2001
WO 2006/135758 A1 12/2006
WO 2015/184103 A1 12/2015

OTHER PUBLICATIONS

Notice of Allowance of Dec. 3, 2014 for U.S. Appl. No. 14/292,240, 11 pages.
(Continued)

*Primary Examiner* — Omeed Alizada
(74) *Attorney, Agent, or Firm* — Kilpatrick Townsend & Stockton LLP

(57) ABSTRACT

The present disclosure relates to an interface device to control an appliance through a network. The interface device can be device-agnostic and can be incorporated into any suitable appliance. Upon initialization, the interface device can determine the capabilities of the attached appliance and send out update information that can be received by a controller. The controller can send commands designated to control the appliance, which are received by the interface device and translated into appropriate commands that are transmitted to the appliance. The interface device can turn the appliance into a network device, such as a home automation network device.

18 Claims, 11 Drawing Sheets

(51) Int. Cl.
  *H04L 12/891* (2013.01)
  *H04L 12/28* (2006.01)
  *H04W 4/00* (2009.01)
(52) U.S. Cl.
  CPC ...... *H04L 47/41* (2013.01); *H04L 2012/2841* (2013.01); *H04W 4/001* (2013.01)

(56) References Cited

U.S. PATENT DOCUMENTS

| | | |
|---|---|---|
| 2003/0095275 A1 | 5/2003 | Christodoulou et al. |
| 2004/0117038 A1 | 6/2004 | Karaoguz et al. |
| 2005/0044225 A1 | 2/2005 | Ota et al. |
| 2008/0188963 A1 | 8/2008 | McCoy |
| 2009/0121842 A1 | 5/2009 | Elberbaum |
| 2009/0235244 A1 | 9/2009 | Enomori et al. |
| 2009/0300164 A1 | 12/2009 | Boggs et al. |
| 2010/0188975 A1 | 7/2010 | Raleigh |
| 2013/0027198 A1 | 1/2013 | Piccolo, III |
| 2014/0156281 A1* | 6/2014 | Boyd .................. H04L 12/281 704/275 |

OTHER PUBLICATIONS

Non-Final Office Action of Aug. 14, 2014 for U.S. Appl. No. 14/292,240, 21 pages.

International Search Report and Written Opinion of the International Searching Authority for PCT Application No. PCT/US2015/032901, mailed Oct. 21, 2015, 19 pages.

\* cited by examiner

NETWORK ADDRESSABLE APPLIANCE INTERFACE DEVICE

TECHNICAL FIELD

The present disclosure relates to network addressable devices generally and more specifically to network addressable interface devices.

SUMMARY

The present disclosure relates to an interface device to control an appliance through a network. The interface device can be device-agnostic and can be incorporated into any suitable appliance. Upon initialization, the interface device can determine the capabilities of the attached appliance and send out update information that can be received by a controller. The controller can send commands designated to control the appliance, which are received by the interface device and translated into appropriate commands that are transmitted to the appliance. The interface device can turn the appliance into a network device, such as a home automation network device. While described within the purview of home automation, the disclosed interface device and appliance serial protocol can be used with appliances that are not used in or in association with a home.

Because the interface device is device-agnostic and polls the attached appliance for capability information and identification information, identical interface devices can be mass produced, can be successfully incorporated into various different types of appliances, and will work correctly without changing the firmware or programming of the interface device.

By offloading the network interactivity and other functions of the interface device to a device-agnostic piece of equipment, the processor of the appliance can be manufactured inexpensively, or at least without the expense of the equipment present in the interface device. Therefore, a manufacturer can produce many appliances at the same, inexpensive cost, and can opt to put an interface device into a subset of those appliances in order to sell that subset as network devices (e.g., network-addressable appliances) while selling the other appliances as standard appliances. Additionally, the device-agnostic interface device can be sold separately and retrofit into appliances 202 that were sold without an interface device.

It can additionally be beneficial to have a device-agnostic interface device, because the interface device can be produced and sold in bulk and used with any suitable appliance without needing to change any hardware or software of the interface device. In one example, a manufacturer of multiple appliances can order a large quantity of interface devices and can decide at any time what portion of the interface devices should be included in which appliances, or even into newly introduced appliances, without needing to reorder different interface devices. Additionally, a manufacturer can order a large quantity of interface devices while the appliances into which the interface devices will be used are still being designed and manufactured.

The present disclosure further relates to an application serial protocol for communicating between an interface device and an appliance. An appliance that can be used with the disclosed interface device can include programming necessary to communicate over an appliance interface using the disclosed application serial protocol.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The specification makes reference to the following appended figures, in which use of like reference numerals in different figures is intended to illustrate like or analogous components

DETAILED DESCRIPTION

Figure 1:
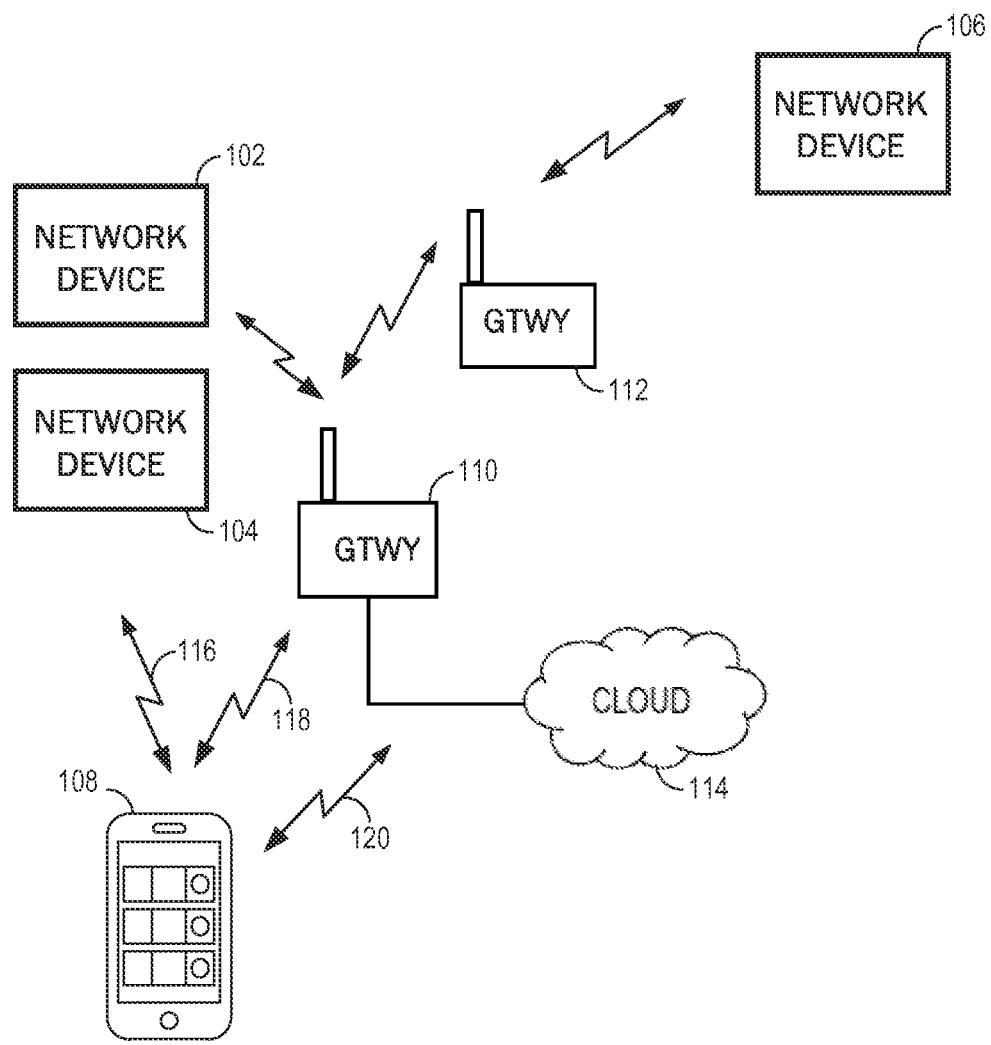
FIG. 1 is a schematic illustration of a local area network according to one embodiment.

The present disclosure relates to an interface device to control an appliance through a network. The interface device can be device-agnostic and can be incorporated into any suitable appliance. Upon initialization, the interface device can determine the capabilities of the attached appliance and send out update information that can be received by a controller. The controller can send commands designated to control the appliance, which are received by the interface device and translated into appropriate commands that are transmitted to the appliance. The interface device can turn the appliance into a network device, such as a home automation network device. While described within the purview of home automation, the disclosed interface device and appliance serial protocol can be used with appliances that are not used in or in association with a home.

Because the interface device is device-agnostic and polls the attached appliance for capability information and identification information, identical interface devices can be mass produced, can be successfully incorporated into various different types of appliances, and will work correctly without changing the firmware or programming of the interface device.

By offloading the network interactivity and other functions of the interface device to a device-agnostic piece of equipment, the processor of the appliance can be manufactured inexpensively, or at least without the expense of the equipment present in the interface device. Therefore, a manufacturer can produce many appliances at the same, inexpensive cost, and can opt to put an interface device into a subset of those appliances in order to sell that subset as network devices (e.g., network-addressable appliances) while selling the other appliances as standard appliances. Additionally, the device-agnostic interface device can be sold separately and retrofit into appliances 202 that were sold without an interface device.

It can additionally be beneficial to have a device-agnostic interface device, because the interface device can be produced and sold in bulk and used with any suitable appliance without needing to change any hardware or software of the interface device. In one example, a manufacturer of multiple appliances can order a large quantity of interface devices and can decide at any time what portion of the interface devices should be included in which appliances, or even into newly introduced appliances, without needing to reorder different interface devices. Additionally, a manufacturer can order a large quantity of interface devices while the appliances into which the interface devices will be used are still being designed and manufactured.

The present disclosure further relates to an application serial protocol for communicating between an interface device and an appliance. An appliance that can be used with the disclosed interface device can include programming necessary to communicate over an appliance interface using the disclosed application serial protocol.

A local area network, such as a user's home local area network, can include multiple network devices that provide various functionalities. For example, a home automation network device may provide a user with the ability to remotely configure or control one or more electronic devices (e.g., appliances) within a home. In some embodiments, the network devices may provide the user with the ability to remotely configure and control electronic devices in one or more environments that can support a local area network. For example, an environment can include a home, an office, a business, an automobile, or the like. Network devices may be accessed by other network devices. When a network device accesses the network, the network device may wish to know the presence and network addresses, such as the IP addresses, of other network devices accessible on the local area network. This process of determining network addresses of network devices on the local area network can be known as network discovery.

The local area network may include one or more gateways that provide the user with access to the network devices. The one or more gateways may also provide the user and the network devices with access to one or more external networks, such as a cloud network, the Internet, and/or other wide area networks.

In some embodiments, an accountless authentication process may be performed so that the user can access one or more network devices within a logical network without having to enter network device login credentials each time access is requested. While located locally within the local area network, the access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

While remote, the user may access the network devices using an external network, such as a cloud network and/or the Internet. An accountless authentication process may also be performed when the user is remote so that the user can access network devices within the logical network without having to enter network device login credentials. For example, a cloud network server may provide a network ID and/or one or more keys to a network device and to an access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

A local area network, such as a user's home local area network, can include multiple network devices that provide various functionalities. Network devices may be accessed and controlled using an access device and/or one or more network gateways. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 is a schematic illustration of a local area network 100 according to one embodiment. The local area network 100 includes network device 102, network device 104, and network device 106. In some embodiments, the network devices 102, 104, 106 may include home automation network devices that allow a user to access, control, and/or configure various home appliances located within the user's home, such as a television, radio, light, fan, humidifier, sensor, microwave, iron, and/or the like. For example, network device 102 may include an appliance that includes an interface device 204 as disclosed in further detail herein. As used herein, the term "appliance" refers generally to any electrical device or piece of equipment designed to perform a specific task. In some embodiments, the interface device 204 can be coupled to an appliance that acts as a home automation switch to supply or cease supplying power to a home appliance. In some embodiments, network devices such as a home automation network device may be used in other environments, such as a business, a school, an establishment, or any place that can support the local area network 100 to enable communication with network devices. For example, a network device can allow a user to access, control, and/or configure devices including office-related devices (e.g., copy machine, printer, fax machine, the like), audio-related devices (e.g., a receiver, a speaker, the like), media-playback devices (e.g., a compact disc player, a CD player, the like), video-related devices (e.g., a projector, a DVD player, the like), computing devices (e.g., a home computer, a laptop computer, a tablet, a personal digital assistant (PDA), a computing device, a wearable device, the like), lighting devices (e.g., a lamp), devices associated with a security system, devices associated with an alarm system, and devices that can be operated in an automobile (e.g., radio devices, navigation devices).

A user may communicate with the network devices 102, 104, 106 using access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). While only a single access device 108 is shown in FIG. 1, one of ordinary skill in the art will appreciate that multiple access devices may connect with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™ WiFi™, IR, cellular, LTE, WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can be utilized for communicating with network devices 102, 104, 106 or access device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides network access among one or more computing devices and/or external networks. For example, gateway 110 may include a router and gateway 112 may include a range extender.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application. In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106, and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

The local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Upon being powered on or reset, the network devices 102, 104, 106 may be registered with the cloud network 114 and associated with a logical network within the local area network 100. When multiple network devices 102, 104, 106 and/or gateways 110, 112 are included within a local area network, the network devices and/or gateways may be installed at different times, resulting in the techniques described below possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

A network device may detect one or more gateways upon being powered on or reset. In some embodiments, a provisioning process may occur when the network device is powered on or reset and detected by an access device. During the provisioning process, the access device may directly communicate with the network device. In some embodiments, direct communication between network devices 102, 104, 106 and access device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the gateway. For example, the login information may be the same information that was originally set up to access the gateway network signals (e.g., when the gateway was initially installed). The access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network. For example, the access device (e.g., via the application, program, or the like) may instruct the network device to register with the cloud network upon receiving confirmation from the network device that it has been successfully paired with a gateway. The network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

The network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

The network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may then process the signature in order to authenticate each device, as described below. The network device and access device may use different techniques to generate a signature.

A network device may generate a signature using its uniquely generated security key. For example, the signature may be expressed as: Authorization=MacAddress":"Signature": "ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

Figure 2:
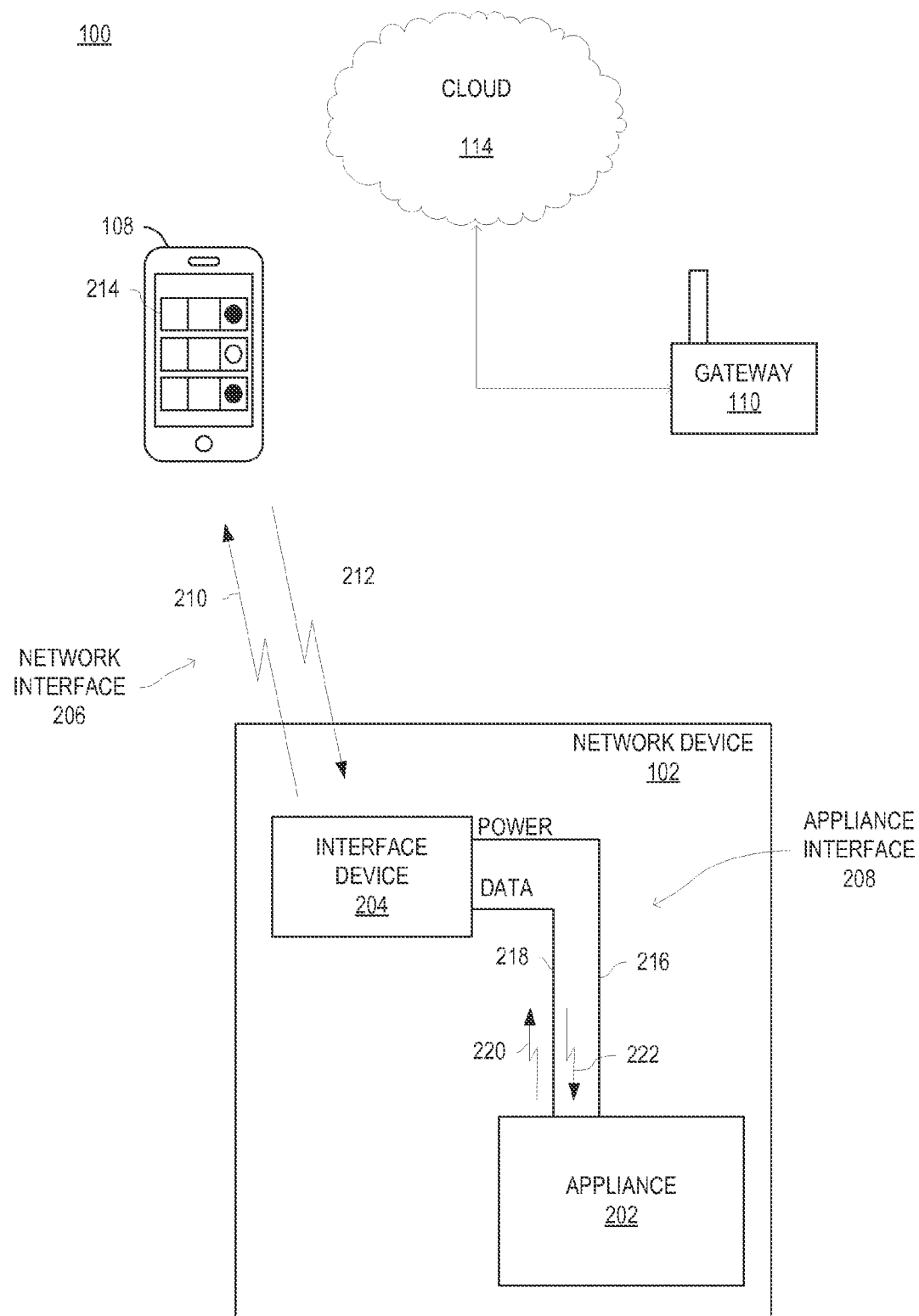
FIG. 2 is a schematic illustration of a local area network including a network device that includes an appliance.

FIG. 2 is a schematic illustration of a local area network 100 including a network device 102 that includes an appliance 202. The network device 102 can comprise an interface device 204 and the appliance 202 connected by an appliance interface 208. The appliance interface 208 can include a data connection 218 and a power connection 216. The data connection 218 can be a serial connection (e.g., RS-232, USB, or other), or any other suitable data connection. The interface device 204 can be fully powered by the appliance 202 through the power connection 216, or can have a separate source of power.

The appliance 202 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 202 can be adapted to operate with the interface device 204. The appliance 202 can be any finite state machine. The appliance 202 can be stateful or stateless.

The interface device 204 can be positioned within the housing of the appliance 202, or can be attached externally to the appliance 202. The interface device 204 can be removable from the appliance 202, or can be permanently installed in or on the appliance 202.

The interface device 204 can be connected to the local area network 100 through the network interface 206. The interface device 204 can be connected by a wired or wireless connection (e.g., WiFi, Zigbee, or others). In some embodiments, the interface device 204 can be connected directly to the cloud network 114 through a cellular internet connection (e.g., EDGE, LTE, or others).

The interface device 204 can communicate with another network device, such as an access device 108, through the network interface 206. The interface device 204 can transmit status information 210 to the access device 108, and the access device can transmit a network device control signal 212 to the interface device 204. The status information 210 and network device control signal 212 can be transmitted directly between the interface device 204 and the access device 108, through a local area network 100 (e.g., through a gateway 110), or through the cloud network 114.

The interface device 204 can interpret the network device control signal 212 and perform actions based on the contents of the network device control signal 212. The network device control signal 212 can include commands that can be performed by the interface device 204 itself. The network device control signal 212 can also include commands that are to be performed by the appliance 202. Commands that are to be performed by the appliance 202 can include commands like turn on, set desired temperature to 215° F., or other commands. The interface device 204 can interpret the network device control signal 212 and send out a command 222, through the appliance interface, based on the network device control signal 212.

The interface device 204 can also transmit commands 222 that are not based on a network device control signal 212, but are rather based on programming in the interface device 204. Examples of such commands 222 can include commands 222 to update a communication rate, commands 222 to check a state of the appliance 202, and commands 222 to set or get a clock time of the appliance 202.

The interface device 204 can receive, through the appliance interface 208, a response 220 to any command 222. The response 220 can include no information other than an indication that the command 222 was received. The response 220 can include information for some value on the appliance 202, such as an "on/off" state, a serial number, a product identification, a manufacturer identification, a temperature, a time since live, a setting, or any other value retrievable from the appliance 202. The interface device 204 can interpret the value and send information about the value (e.g., the state of the appliance is "on," the temperature of the appliance is 175° F., the time since the appliance first turned on is 17 seconds, or other information) as status information 210 to the access device 108. Additionally, the interface device 204 can send status information about itself (e.g., time since live, supplied power, signal strength, and others) as status information 210 to the access device 108.

The interface device 204 can also use responses 220 to perform additional functions at the interface device 204, such as error handling. In these cases, the interface device 204 does not transmit any status information 210 to the access device 108 based on those particular responses 220.

The access device 108 can include a display tile 214 for displaying information and controls corresponding to the network device 102.

In some embodiments, the interface device 204 can transmit a command 222 that is a heartbeat command to the appliance 202 to determine whether the appliance 202 is working properly and/or in a state of readiness. If the interface device 204 determines that the appliance 202 has had some sort of failure (e.g., the appliance 202 sends a response 220 indicating a failure or the interface device 204 does not receive any response 220), the interface device 204 can take corrective action (e.g., restarting the appliance 202 or an element of the appliance 202), can log the event, or can alert the user.

Figure 3:
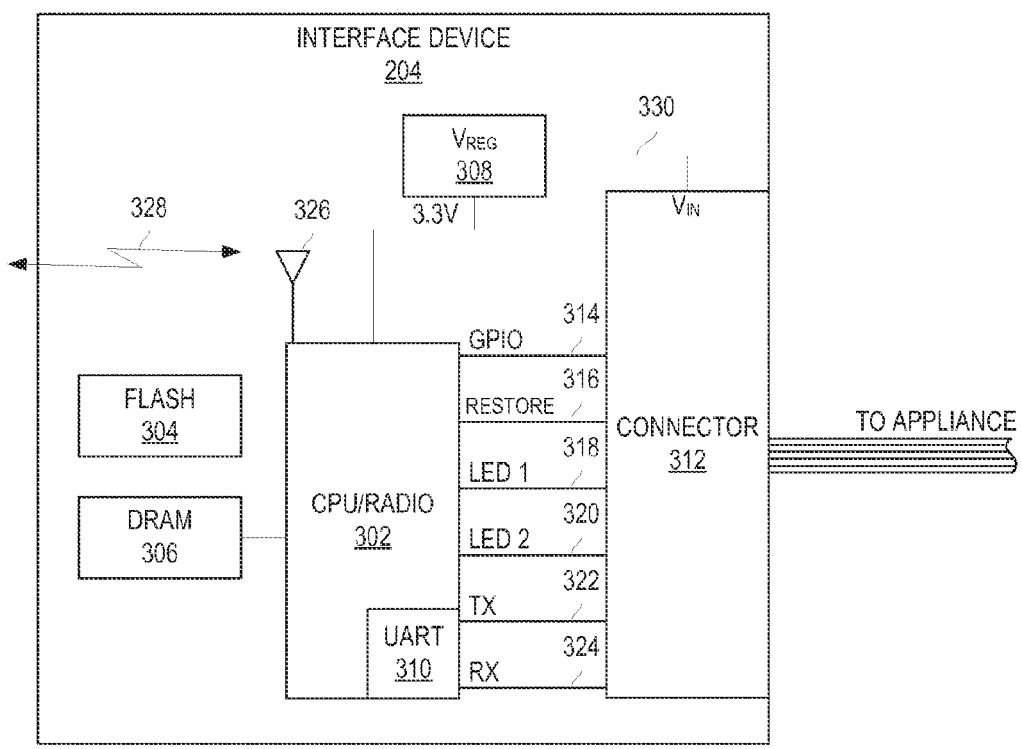
FIG. 3 is an example of a block diagram of the interface device depicting different hardware and/or software components of the interface device according to one embodiment.

FIG. 3 is an example of a block diagram of the interface device 204 depicting different hardware and/or software components of the interface device 204 according to one embodiment. The interface device 204 can include flash memory 304 and dynamic random access memory (DRAM) 306. The flash memory 304 may be used to store instructions or code relating to an operating system, one or more applications, and any firmware. The flash memory 304 can be used to store a cache. The flash memory 304 may include nonvolatile memory so that any firmware or other program can be can updated. In the event the interface device 204 loses power, information stored in the flash memory 304 may be retained. The DRAM 306 may store various other types of information needed to run the interface device 204, such as all runtime instructions or code. The flash memory 304 or DRAM 306 or a combination thereof may include all instructions necessary to communicate with an appliance 202, including all instructions necessary to communicate using the appliance serial protocol disclosed herein.

The interface device 204 further includes a CPU/Radio 302. The CPU/Radio 302 can control the operations of the interface device 204. For example, the CPU/Radio 302 may execute various applications or programs stored in the flash memory 304 and/or the dynamic random access memory (DRAM) 306. The CPU/Radio 302 may also receive input from the appliance 202, interpret the input, and perform one or more functions in response to the input. The CPU/Radio 302 may further perform all communications functions in order to allow the interface device 204 to communicate with other network devices, one or more gateways, a cloud network, and/or one or more access devices. The interface device 204 may communicate with other devices and/or networks via antenna 326. For example, antenna 326 may include a 2.4 GHz antenna that can transmit and receive WiFi communications signals 328. The antenna 326 may include other types of antennas that can communicate Bluetooth® signals, Zigbee® signals, Ultra-Wideband (UWB) signals, and/or the like. In some embodiments, the interface device 204 may include multiple antennas for communicating different types of communication signals.

The CPU/Radio 302 can include at least one universal asynchronous receiver/transmitter (UART) 310. The CPU/Radio 203 can use the UART 310 to send and receive serial communications. The CPU/Radio 203 can send data through a transmit line 322 and a receive data through a receive line 324. The CPU/Radio 203 can send and receive data through the transmit line 322 and receive line 324 using a serial protocol, such as RS232. The CPU/Radio 302 can also include a general purpose input/output (GPIO) line 314, a restore line 316, an LED 1 line 318, and an LED 2 line 320. The CPU/Radio 302 can have additional or fewer lines as necessary. The GPIO line 314 can be used for any suitable function, such as powering an indicator light on an appliance 202 or accepting an input from the appliance 202. A signal sent on the restore line 316 can be used to restore the CPU/Radio 302 and/or the interface device 204 to factory defaults. The LED 1 line 318 and LED 2 line 320 can be used to power first and second LEDs that can be used to indicate various statuses, such as whether the interface device has a network connection and whether the interface device is powered on.

The interface device 204 further includes a voltage regulator 308. The voltage regulator 308 may be used to convert the voltage output from the appliance 202 to a voltage usable by the CPU/Radio 302. For example, the voltage regulator 308 may regulate the DC voltage from 5V to 3.3V. The voltage regulator 308 can be supplied with power from a power line 330.

Each of the interface lines, including the GPIO line 314, the restore line 316, the LED 1 line 318, the LED 2 line 320, the transmit line 322, the receive line 324, the power line 330, and any additional lines, can be routed through connector 312. Connector 312 can be a proprietary or universal connector. Any appliance 202 to which the interface device 204 is attached through the connector 312 can have the necessary hardware to make use of the interface lines, such as to provide power to the power line 330 and to provide the first and second LEDs that are driven by the LED 1 line 318 and LED 2 line 320.

In alternate embodiments, some interface lines are not routed through the connector 312. For example, the power line 330 can be routed to a power supply attached directly to the interface device 204, and the LED 1 line 318 and LED 2 line 320 can be routed to first and second LEDs located within the interface device 204.

In various embodiments, functions may be stored as one or more instructions or code in memory, such as the flash memory 304 and/or the DRAM 306. The interface device 204 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform various steps described below. The memory, such as the flash memory 304 and/or the DRAM 306, may be a processor-readable memory and/or a computer-readable memory that stores software code (programming code, instructions, etc.) configured to cause a processor(s) within the CPU/Radio 302 to perform the functions described. In other embodiments, one or more of the functions described may be performed in hardware.

A set of these instructions and/or code might be stored on a computer-readable storage medium, such as the flash memory 304 and/or the DRAM 306. In some cases, the storage medium might be incorporated within a computer system, such as the CPU/Radio 302. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the interface device 204 and/or might take the form of source and/or installable code, which, upon compilation and/or installation on the interface device 204 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 204 may have other components than those depicted in FIG. 3. Further, the embodiment shown in the figures are only one example of an interface device that may incorporate an embodiment of the invention. In some other embodiments, interface device 204 may have more or fewer components than shown in the figure, may combine two or more components, or may have a different configuration or arrangement of components.

Figure 4:
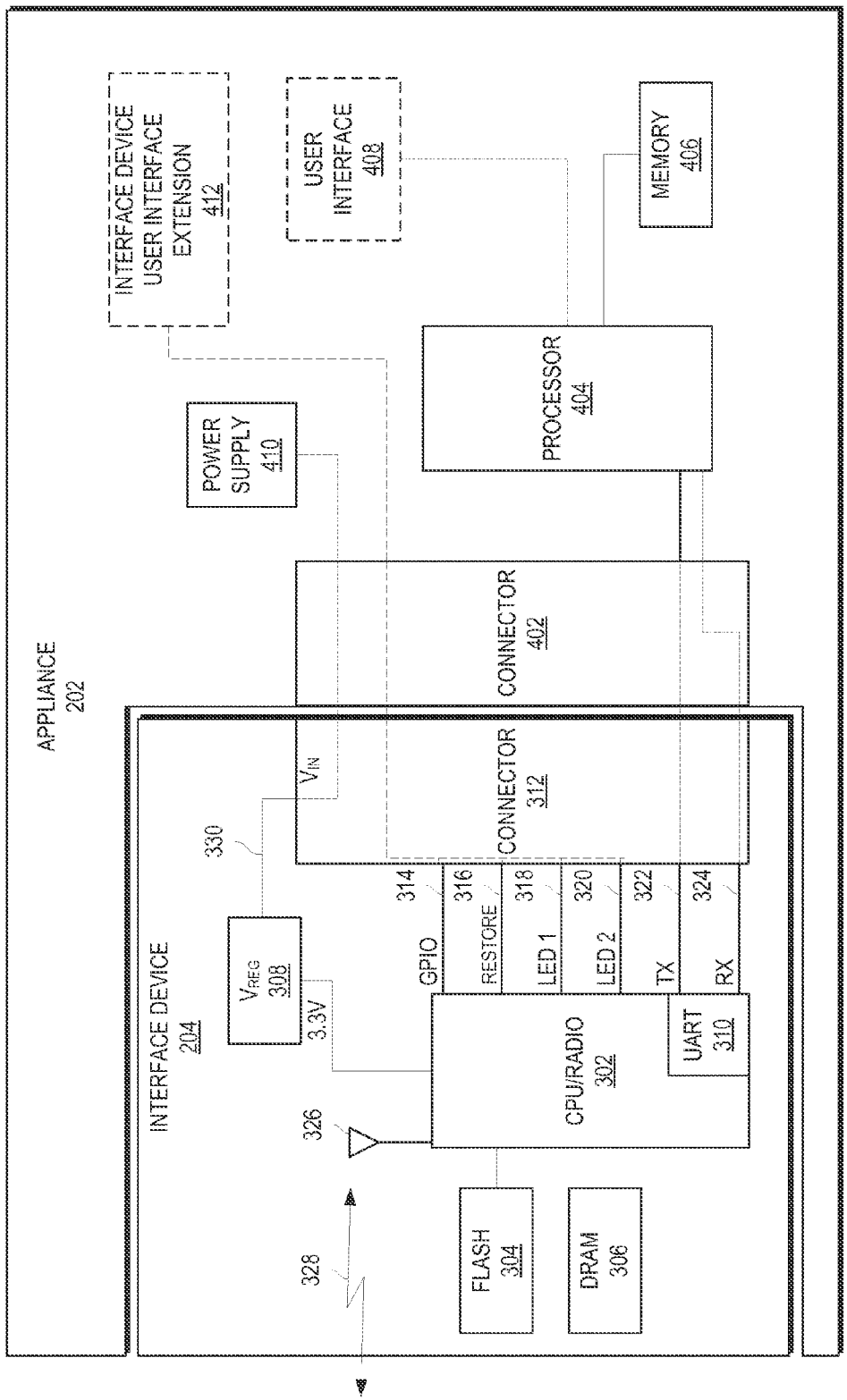
FIG. 4 is an example of a block diagram of a network device including an interface device attached to an appliance according to one embodiment.

FIG. 4 depicts a block diagram of a network device 102 including an interface device 204 attached to an appliance 202 according to one embodiment. The interface device 204 can include connector 312 that interacts with connector 402 of the appliance 202.

The appliance 202 can have a processor 404. The processor 404 can be a microcontroller, such as a Peripheral Interface Controller (PIC). The appliance 202 can include a memory 406 (e.g., a flash memory or other) that is readable by the processor 404. The memory 406 can include instructions enabling the innate functionality of the appliance 202, such as heating and timing for a crock pot.

The appliance 202 can include a user interface 408. The user interface 408 can provide buttons, displays, LEDs, knobs, and other input and output elements necessary for a user to interact with the appliance 202. For example, a user interface 408 for a slow cooker can include a display, a power button, a temperature adjustment button, and a start button. The user interface 408 can be driven and/or monitored by the processor 404. In some embodiments, the appliance 202 is "headless" or has no user interface 408.

The appliance 202 can include a power supply 410 that can provide power to the voltage regulator 308 of the interface device 204 through connector 402, connector 312, and power line 330.

The appliance 202 can include an interface device user interface extension 412. The interface device user interface extension 412 can include various input and output elements that are passed directly to the interface device 204 without being processed by the processor 404. Examples of input and output elements of the interface device user interface extension 412 include LEDs associated with the LED 1 line 318 and LED 2 line 320, a hardware restore button associated with the restore line 316, or any other suitable input/output element.

Figure 5:
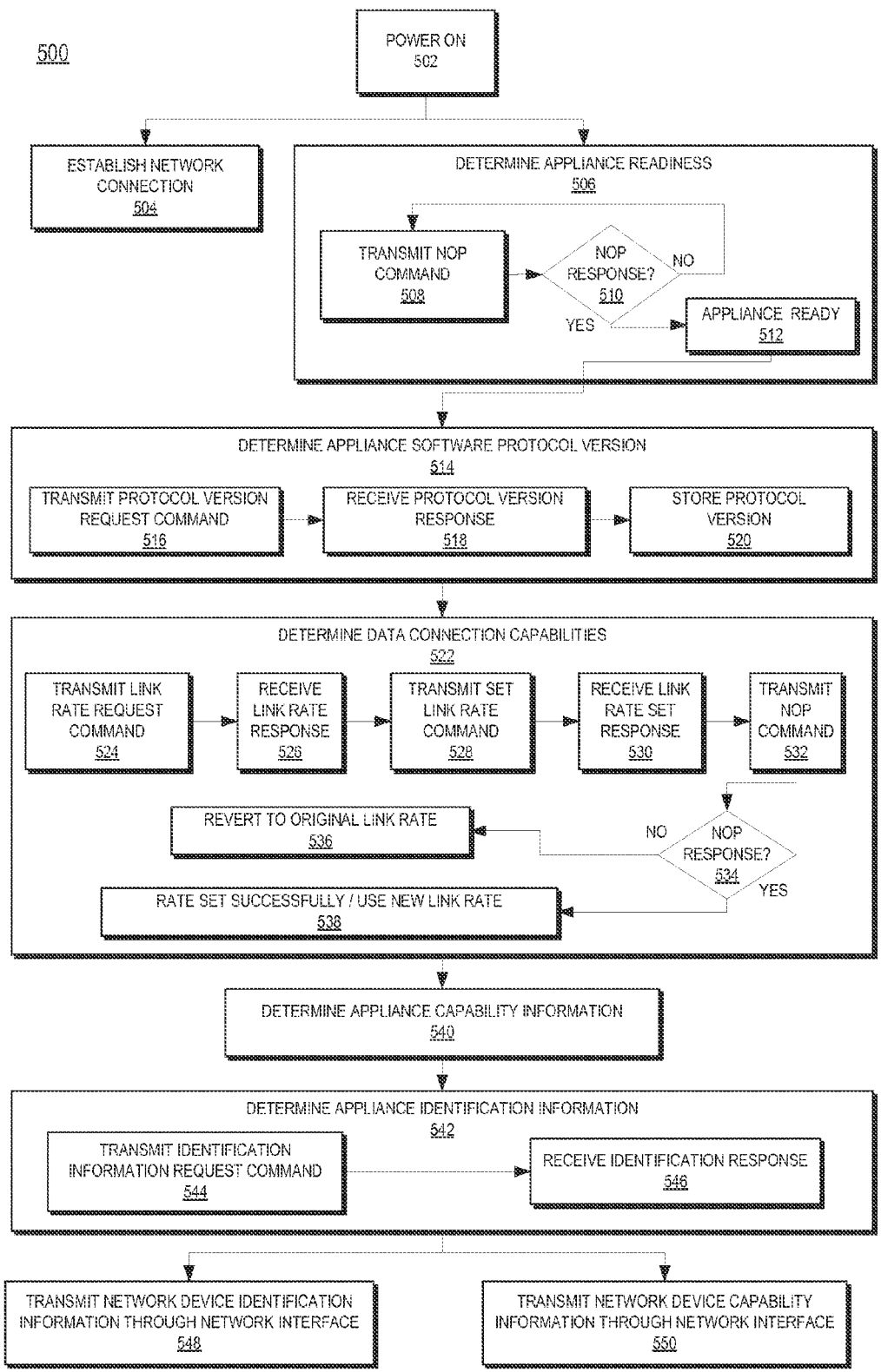
FIG. 5 is a flowchart illustrating an initialization procedure of an interface device according to one embodiment.

FIG. 5 is a flowchart illustrating an initialization procedure 500 of an interface device 204 according to one embodiment. The interface device 204 can be device-agnostic. The interface device 204 can be connected to an appliance 202 by an appliance interface 208 (e.g., by connecting connector 312 and connector 402).

Upon powering on the appliance 202, the appliance can provide power to the interface device 204 from the power supply 410 at block 502. The interface device 204 can start up and can perform an initialization procedure 500. After powering on at block 502, the interface device 204 can attempt to establish a network connection at block 504. The interface device 204 can attempt to contact a known wireless network, which information can be stored in flash memory 304, or a wired network. If no wired network is present and/or no wireless network is known, the interface device 204 can establish an ad-hoc wireless network and await connection from an access device 108 or other network device.

Simultaneously, before, or after establishing a network connection at block 504, the interface device 204 can determine appliance readiness at block 506. To determine appliance readiness, the interface device 204 can send, through the appliance interface 208, a command 222 that is a no operation (NOP) command at block 508. The interface device 204 can listen for a response 220 from the appliance 202 at block 510. If a response 220 that is a NOP response is received, the interface device 204 knows that the appliance 202 is in a state of readiness at block 512. If no response 220 is received, the interface device 204 can continue to send commands 222 that are NOP commands at block 508 and wait for a response at block 510 until a response 220 is received. In alternate embodiments, the interface device 204 can continue determining appliance readiness for a limited amount of time or for a limited number of repetitions until producing an error.

After determining the appliance 202 is in a state of readiness, the interface device 204 can determine the appliance software protocol version at block 514. The appliance 202 and interface device 204 each contain software that determines how commands 222 and responses 220 are transmitted, received, and interpreted. In some circumstances, it may be the case that the software protocol version on either the appliance 202, or more likely the interface device 204, is newer than the software protocol version on the other. In order to ensure proper communication and functioning, the interface device 204 can determine the current software and/or software protocol version on the appliance. If the software protocol on the appliance 202 is older than the software protocol on the interface device 204, the interface device 204 can revert to an older version of the software protocol or disable the use of certain commands and functionality unavailable to the appliance 202. If the software protocol on the appliance 202 is newer, the interface device 204 can act accordingly, such as by notifying the user through the access device 108, downloading updated software (e.g., an updated software protocol version) from the access device 108, another network device on the local area network 100, or the cloud network 114, or by downloading updated software (e.g., an updated software protocol version) from the appliance 202.

The interface device 204 can transmit a command 222 that is a protocol version request to the appliance 202 at block 516. The appliance 202, upon receiving the protocol version request, can transmit a response 220 that is a protocol version response, which can be received by the interface device 204 at block 518. The protocol version response can include information about the current version of the software (e.g., the software protocol version) running on the appliance 202. The software can be the application specific protocol described herein, or any other protocol for transferring data between an interface device and an appliance 202. The protocol version can be stored as a variable in the memory 406 of the appliance 202. Upon receiving the protocol version response at block 518, the interface device 204 can store the protocol version of the attached device in flash memory 304 or in another memory of the interface device 204 as an appliance software protocol version at block 520. The interface device 204 can always overwrite any previously stored appliance software protocol version. The interface device 204 can then use the appliance software protocol version as a baseline for knowing what commands are available to send.

In an example, the interface device 204 can be loaded with a more recent version of the software than the appliance 202. The more recent version of the software may have additional or replacement commands, or may be different in other ways. Since the appliance 202 will not have knowledge of the additional or replacement commands, the interface device 204 cannot use those different commands By querying the appliance 202 for its current software, the interface device 204 can use the appropriate version of the software. In some embodiments, the interface device 204 can include multiple versions of the software, and can use the appropriate version based on the appliance software protocol version. In other embodiments, the interface device 204 can retrieve the correct protocol version from an external source, such as the access device 108 or the cloud network 114, based on the appliance software protocol version. In other embodiments, the interface device 204 includes one protocol version, but can disable or change certain commands and other protocols based on the appliance software protocol version.

During the initialization procedure 500, the interface device 204 can determine appliance data connection capabilities at block 522. While the interface device 204 and appliance 202 may begin transmitting and receiving data through the appliance interface 208 based on certain default settings, the interface device 204 and appliance 202 may be capable of supporting more efficient, faster, or otherwise more desirable communication settings. For example, the interface device 204 and appliance 202 can start communicating over the appliance interface 208 using a serial connection at 9600 baud. However, if both the interface device 204 and appliance 202 are capable of supporting 57600 baud, the interface device 204 and appliance 202 can switch to communicating over the appliance interface 208 using a serial connection at 57600 baud. Other communication settings besides link rate can be adjusted during at block 522 similarly to how link rate is adjusted as described below.

In an embodiment, the interface device 204 can transmit, at an original link rate (e.g., a default link rate) a command 222 that is a link rate request through the appliance interface 208 at block 524. Upon receiving the link rate request, the appliance 202 can transmit a response 220 that is a link rate response containing the maximum link rate supported by the appliance 202. The link rate response can optionally include a list of all link rates supported by the appliance 202. The link rate response can be received by the interface device 204 at block 526. Upon receiving the link rate response at block 526, the interface device 204 can attempt to set the link rate to a higher rate, such as the maximum link rate, by transmitting a command 222 that is a set link rate command at block 528. Upon receiving the set link rate command, the appliance 202 will respond with a response 220 that is a link rate set response indicating either that the link rate was set, or an error occurred. If an error occurred, the interface device 204 can attempt to set the link rate again, or can abort attempting to determine data connection capabilities.

After receiving a link rate set response at 530 that indicates the link rate was set, the interface device 204 can transmit commands 222 that are NOP commands at block 532. The interface device 204 can listen for responses 220 that are NOP responses at block 534. If no NOP responses are received at block 534, the interface device 204 knows that the new link rate was unsuccessful and can revert to the original link rate at block 536. In alternate embodiments, the interface device 204 can continue trying to set the link rate at other rates listed in the link rate response (e.g., the next lowest link rate from the maximum support link rate). If an NOP response is received at block 534, the interface device 204 knows that the rate was set successfully and can continue to use the new link rate for future communications across the appliance interface 208 at block 538.

During the initialization procedure 500, the interface device 204 can determine appliance capability information at block 540, as described in further detail below.

During the initialization procedure 500, the interface device 204 can determine appliance identification information at block 542. The interface device 204 can transmit a command 222 that is an identification information request at block 544. The identification information request can be one or more commands that request one or more of the appliance's product identification number (PID), product serial number (SN), manufacturer/vendor identification number (VID), product model, interface identification number, or other identification information. Upon receiving the identification information request, the appliance 202 can transmit a response 220 that is an identification response containing the requested information. The identification response can be received at block 546.

The interface device 204 can transmit network device identification information through the network interface at block 548. The network device identification information includes the appliance identification information obtained at block 542. The network device identification information can optionally include additional information related to the interface device 204 itself, such as firmware version of the interface device 204, information stored in the flash memory 304 of the interface device 204 that is not related to the appliance 202, the size of the firmware on the interface device 204, a list of any potential permission issues in the interface device 204, and others. The interface device 204 can transmit the network device identification information to the cloud network 114, a network device on the local area network 100, or an access device 108. The access device 108 can use the network device identification information to determine how to display and name the display tile 214 that is used to display information and controls corresponding to the network device 102 including the appliance 202.

The interface device 204 can transmit network device capability information through the network interface at block 540, as described in further detail below. The network device capability information includes the appliance capability information obtained at block 546. The network device capability information can optionally include additional capability information related to the interface device 204 itself, such as information related to signal strength of the interface device 204, network connectivity interface options available (e.g., LTE, BLE, ZigBee, etc.), session duration, temperature of the interface device 204, available memory on the interface device 204, registration status of the interface device 204, and others. The interface device 204 can transmit the network device capability information to the cloud network 114, a network device on the local area network 100, or an access device 108. The access device 108 can use the network device capability information to determine what information and controls can be incorporated into the display tile 214 that is used to display information and controls corresponding to the network device 102 including the appliance 202.

Therefore, regardless of the network device's 102 ability to obtain information on how to visually present the display tile 214 (e.g., with customized icons and images), such as if the network device 102 and access device 108 have no connection to the cloud network 114 in instances where the information on how to visually present the display tile 214 is stored in the cloud network 114, the network device 102 is always able to send the network device capability information to the access device 108, which the access device 108 can use to functionally generate a display tile 214 that includes all necessary functions of the appliance 202 (e.g., an on/off button, a low/medium/high setting, a temperature readout, and others).

The user can be presented with a display tile 214 that contains meaningful contextual information, such as "Power On," "Power Off," "Set Fan Speed to High," "Set Fan Speed to Low," or others. When the access device 108 sends a network device control signal 212 to the interface device 204, the network device control signal 212 does not contain any contextual information, rather the network device control signal 212 can contain a command for the network device 102 to set a controllable value corresponding to the appliance's power state (e.g., the value associated with value ID 0x12) to "1" or "0," or to set a controllable value corresponding to the appliance's fan speed (e.g., the value associated with value ID 0x13) to "2" or "0." Additionally, the interface device 204 does not need to send any contextual information to the appliance 202 in a command 222, but can rather send only instructions to set a controllable value corresponding to the appliance's power state (e.g., the value associated with value ID 0x12) to "1" or "0," or to set a controllable value corresponding to the appliance's fan speed (e.g., the value associated with value ID 0x13) to "2" or "0."

Figure 6:
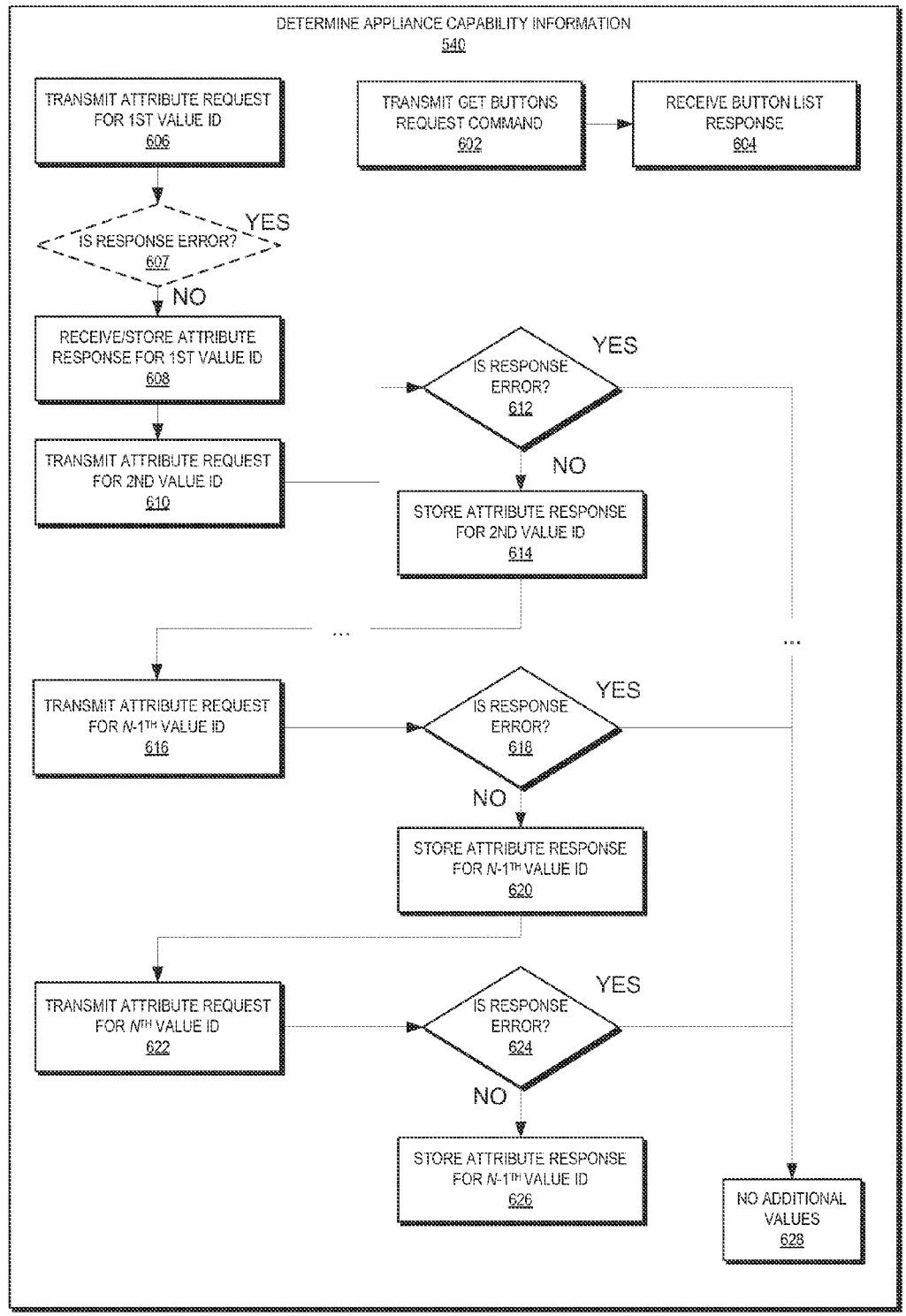
FIG. 6 is a flow chart illustrating determining appliance capability information according to one embodiment.

FIG. 6 is a flow chart depicting determining appliance capability information according to one embodiment. The interface device can determine appliance capability information at block 540 during an initialization procedure 500.

The appliance capability information can include information related to what buttons are available on the appliance 202. Available buttons can include physical buttons (e.g., "on" or "start") as well as pseudo buttons. Pseudo buttons are not hardware buttons, but can represent other events, such as a combination of buttons pressed when the appliance 202 is powered on (e.g., to represent a factory restore button being pressed), or a setting being changed in the appliance 202. The appliance capability information can also include information related to values what of the appliance 202 are accessible. Accessible values can include read-only static values (e.g., serial number), read-only variables (e.g., measured temperature), and controllable variables (e.g., settings, such as heat setting). The values correspond to various functions of the appliance 202. Examples of possible functions of an appliance 202 can include the ability to perform an action (e.g., heat a filament), ability to measure a variable (e.g., temperature), ability to count time, ability to have status or condition (e.g., "on" or "off"), ability to store date (e.g., a string or blob of data), settings regarding any ability, and any other action the appliance 202 can perform.

The interface device 204 can transmit a command 222 that is a get buttons request command at block 602. Upon receiving the get buttons request, the appliance 202 can transmit a response 220 that is a button list response. The button list response can include a list of possible buttons available on the appliance 202, including physical buttons and pseudo buttons. The interface device 204 can receive the button list response at block 604.

The interface device 204 can be device-agnostic, or in other words does not necessarily know the possible functions of the appliance 202. The interface device 204 can send various attribute requests to the appliance 202, where each attribute request includes a value identification number. Each unique value of the appliance 202 can have a unique value identification number. The interface device 204 can populate a database of appliance capability information that includes a list of each value identification number used by the appliance 202 and value attributes associated with each value identification number. The interface device 204 can send out sequential attribute requests including sequentially numbered value identification numbers until the appliance 202 responds with an invalid argument error, which indicates that the appliance 202 has no additional values that can be accessed by the interface device 204.

The interface device 204 can transmit a command 222 that is an attribute request that includes a first value identification number (value ID) at block 606. The appliance 202 can receive the attribute request and transmit a response 220 that is an attribute response for the first value ID. The attribute response can include various attributes associated with the first value ID. The various attributes can include a type category and a usage category. Additional attributes are described in further detail below. In some embodiments, the interface device 204 can detect an invalid argument error at block 607. However, in alternate embodiments, the interface device 204 may assume that an attribute request that includes a first value ID will never produce an invalid argument error. For example, in some embodiments, the interface device 204 may assume that any connected appliance 202 will have at least one (e.g., a first) value ID. The interface device 204 can receive and store the attribute response for the first value ID at block 608.

The interface device 204 can transmit a command 222 that is an attribute request that includes a second value ID at block 610. Upon receiving the attribute request for the second value ID, the appliance 202 can generate a response 220 that is an attribute response for the second value ID. If the appliance 202 has a value at the second value ID, the attribute response for the second value ID will not produce an invalid argument error and will contain attribute information for the value at the second value ID. The attribute response for the second value ID is received by the interface device 204 at block 612. If the interface device 204 detects an invalid argument error at block 612, the interface device 204 knows that the appliance 202 has no value at the second value ID and knows that the appliance 202 has on additional values at block 628. If the interface device 204 does not detect an invalid argument error at block 612, the interface device 204 can store the attribute response for the second value ID at block 614 and continue requesting attributes.

The interface device 204 can transmit a command 222 that is an attribute request that includes an $n-1^{th}$ value ID at block 616. Upon receiving the attribute request for the $n-1^{th}$ value ID, the appliance 202 can generate a response 220 that is an attribute response for the $n-1^{th}$ value ID. If the appliance 202 has a value at the $n-1^{th}$ value ID, the attribute response for the $n-1^{th}$ value ID will not produce an invalid argument error and will contain attribute information for the value at the $n-1^{th}$ value ID. The attribute response for the $n-1^{th}$ value ID is received by the interface device 204 at block 618. If the interface device 204 detects an invalid argument error at block 618, the interface device 204 knows that the appliance 202 has no value at the $n-1^{th}$ value ID and knows that the appliance 202 has no additional values at block 628. If the interface device 204 does not detect an invalid argument error at block 618, the interface device 204 can store the attribute response for the $n-1^{th}$ value ID at block 620 and continue requesting attributes.

The interface device 204 can transmit a command 222 that is an attribute request that includes an $n^{th}$ value ID at block 622. Upon receiving the attribute request for the $n^{th}$ value ID, the appliance 202 can generate a response 220 that is an attribute response for the $n^{th}$ value ID. If the appliance 202 has a value at the $n^{th}$ value ID, the attribute response for the $n^{th}$ value ID will not produce an invalid argument error and will contain attribute information for the value at the $n^{th}$ value ID. The attribute response for the $n^{th}$ value ID is received by the interface device 204 at block 624. If the interface device 204 detects an invalid argument error at block 642, the interface device 204 knows that the appliance 202 has no value at the $n^{th}$ value ID and knows that the appliance 202 has no additional values at block 628. If the interface device 204 does not detect an invalid argument error at block 624, the interface device 204 can store the attribute response for the $n^{th}$ value ID at block 626.

In some embodiments, the interface device 204 can continue transmitting attribute requests until a response including an invalid argument error is received from the appliance 202. In other embodiments, a finite number of possible value IDs exist, and the interface device 204 continues transmitting attribute requests through to the last possible value ID, after which the interface device 204 moves to block 628 because no additional values are possible.

In alternate embodiments, the interface device 204 can transmit a command 222 that is a global attribute request. The appliance 202 can receive the global attribute request and transmit a response 220 that is a global attribute response. The global attribute response can include a list of one or more value IDs available to the appliance 202, along with any respective attributes associated with each value ID in the list of one or more value IDs. The interface device 204 can receive and store the global attribute response, which contains some or all attributes associated with every accessible value ID of the appliance 202.

Referring back to FIG. 5, the interface device 204 can determine appliance identification information at block 524 after determining appliance capability information. In some embodiments, the appliance identification information is stored in values of the appliance 202. The interface device 204 can use the stored value attributes to determine which value IDs include appliance identification information and tailor the identification information requests at block 544 based on the value IDs associated with the desired appliance identification information. In alternate embodiments, the appliance identification information can be accessed without first determining appliance capability information.

Figure 7:
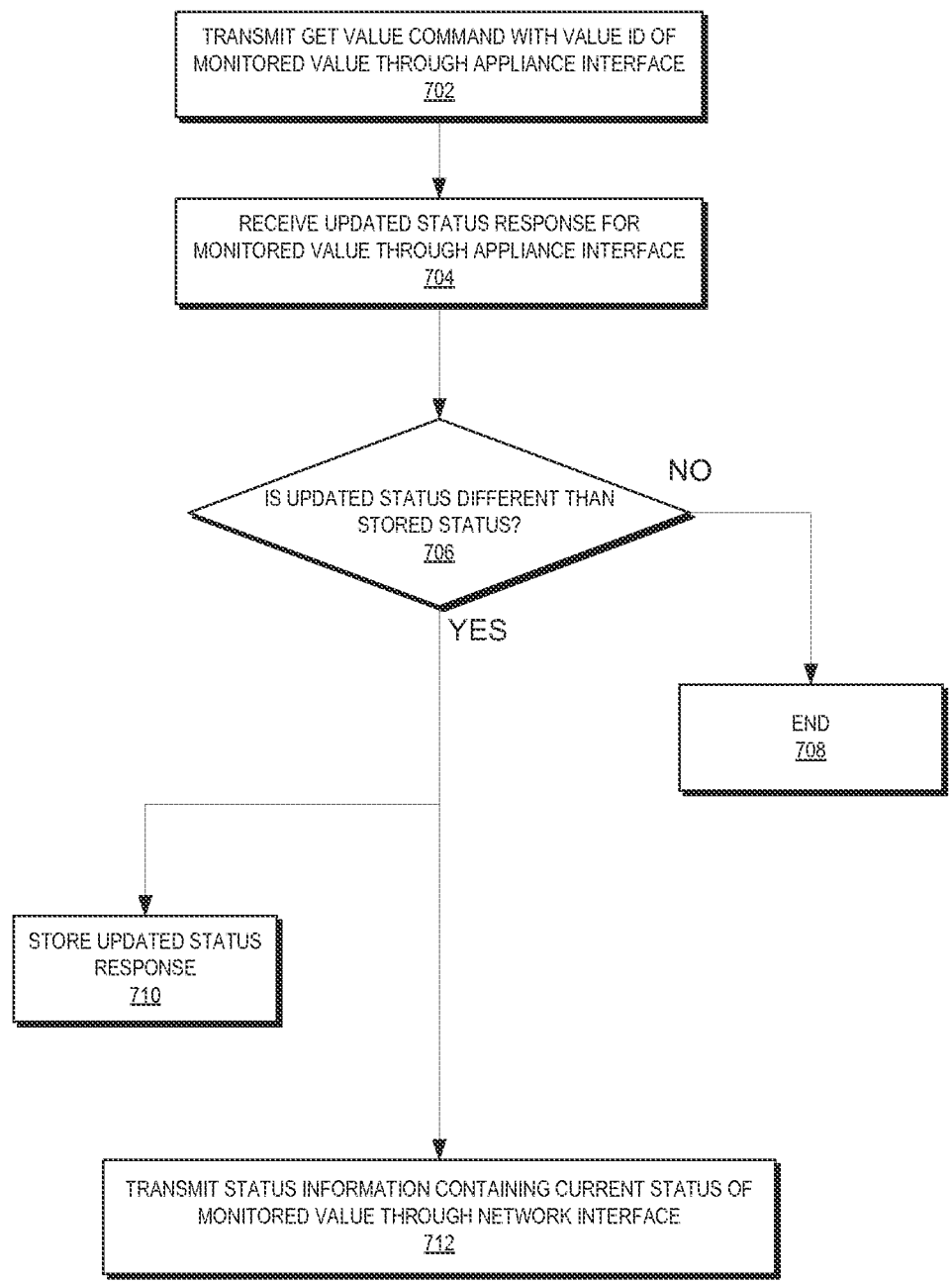
FIG. 7 is a flow chart illustrating a status update procedure according to one embodiment.

FIG. 7 is a flow chart depicting a status update procedure 700 according to one embodiment. As used herein, the term "update" does not require a previously stored value. The interface device 204 can poll the appliance 202, through the appliance interface 208, for a status of a readable value. The readable value can be any value readable by the interface device 204 (e.g., a fixed value, a monitored value, or other, as described below). The readable value can correspond to a condition of the appliance 202. The interface device 204 can transmit, through the appliance interface 208, a command 222 that is a get value command at block 702. The get value command includes the value ID for the desired readable value. The appliance 202, upon receiving the get value command, can transmit, through the appliance interface, a response 220 that is an updated status response at block 704. The updated status response can include the current status (e.g., a number of condition associated with the value having the value ID supplied in the get value command. The current status or condition can be any piece of information associated with the readable value, such as a number, a string, or any other data. The updated status response is received, through the appliance interface 208, by the interface device 204 at block 704.

In alternate embodiments, the appliance 202 can push an updated status of a readable value to the interface device 204, rather than waiting for the interface device 204 to poll the appliance 202. For example, an appliance 202 that is a washing machine can push an updated status of a readable value to an interface device 204 when the washing machine has completed a cycle. In another example, an appliance 202 that is an oven can push an updated status of a readable value to an interface device 204 when the oven has reached a desired temperature.

In some embodiments, the interface device 204 can compare the status information 210 that includes the current status (e.g., numeric value) of the readable value with previously stored status information 210 for that particular value ID. If the status information 210 is not different than the status information 210 that has been previously stored (e.g., the value for that particular value ID has not changed since the last time it was queried by the interface device 204), than the process can end at block 708. If the status information 210 is different than the status information 210 that has been previously stored (e.g., the value for that particular value ID has changed since the last time it was queried by the interface device 204), than the interface device 204 can store the updated status information 210 at block 710, such as in a memory, and the interface device 204 can transmit the status information 210 through the network interface at block 712. At block 712, the interface device 204 can then send, through the network interface 206, status information 210 that includes the updated current status (e.g., numeric value) of the readable value. The status information 210 can be sent to the cloud network 114, a network device on the local area network 100, or the access device 108. Through this status update procedure 700, the interface device 204 can transmit an updated current status of any value of the appliance 202 to the cloud network 114, a network device on the local area network 100, or the access device 108. The cloud network 114 can receive the current status and update a cache or memory on a server in the cloud network 114 based on the current status. A network device on the local area network 100 can receive the current status and perform an action (e.g., turning on a light switch) based on the current status. The access device 108 can receive the current status and update the display tile 214 based on the current status.

In alternate embodiments, the interface device 204 does not check the status information with a previously stored value at block 706 and does not store the status information at block 710, rather it immediately transmits, at block 712, and status information received at block 704.

Figure 8:
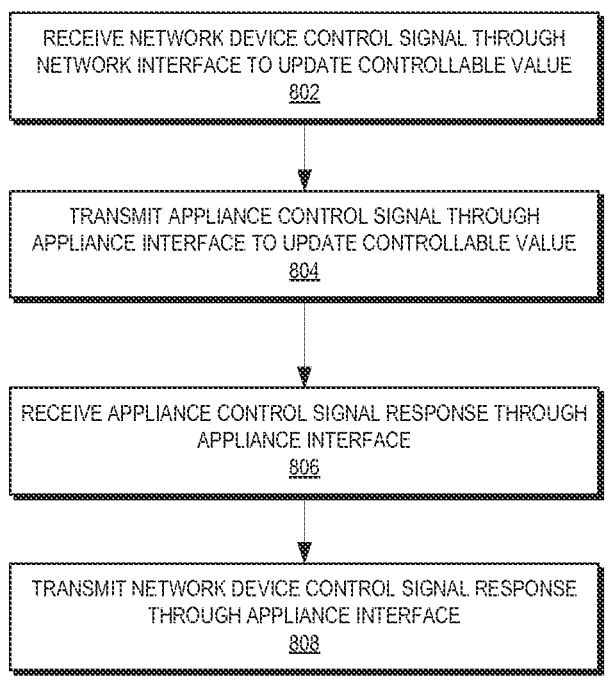
FIG. 8 is a flow chart illustrating an appliance control procedure according to one embodiment.

FIG. 8 is a flow chart depicting an appliance control procedure 800 according to one embodiment. The interface device 204 can control the appliance 202 by updating values on the appliance 202 that are associated with controllable functions of the appliance 202 (e.g., a temperature setting, "on"/"off"/"standby" setting, and others). The interface device 204 can control the appliance 202 based on a network device control signal 212 received by the interface device 204. The interface device 204 can receive a network device control signal 212 through the network interface 206 at block 802. The network device control signal 212 can include an instruction to update a value of the appliance 202. The interface device can transmit a command 222 that is an appliance control signal through the appliance interface 208 at block 804. The appliance control signal can be based on the instruction to update the value of the appliance 202 that was received at block 802. The appliance control signal can be a set value command. Upon receiving the appliance control signal, the appliance 202 can update a value based on the instruction to update the value of the appliance 202. Updating such a value can cause the appliance 202 to perform an action (e.g., turn on, turn off, turn on high heat, attempt to stabilize heat around a new set temperature, and others).

In some embodiments, the appliance 202 can transmit, through the appliance interface 208, a response 220 that is an appliance control signal response. The appliance control signal response can indicate whether the appliance 202 successfully updated the value based on the appliance control signal transmitted at block 804, or an error condition if the value was not successfully updated. The interface device 204 can receive, through the appliance interface 208, the appliance control signal response at block 806. Upon receiving the appliance control signal response at block 806, the interface device 204 can transmit, through the network interface 206, a network device control signal response. The network device control signal response can be based on the appliance control single response, and can include information about whether the network device control signal was successful in updating the value of the appliance 202 as provided in the instructions contained within the network device control signal. The network device control signal response can be transmitted to the cloud network 114, a network device on the local area network 100, or the access device 108. The network device control signal response can be used to provide positive feedback that the instructions were carried out successfully.

Figure 9:
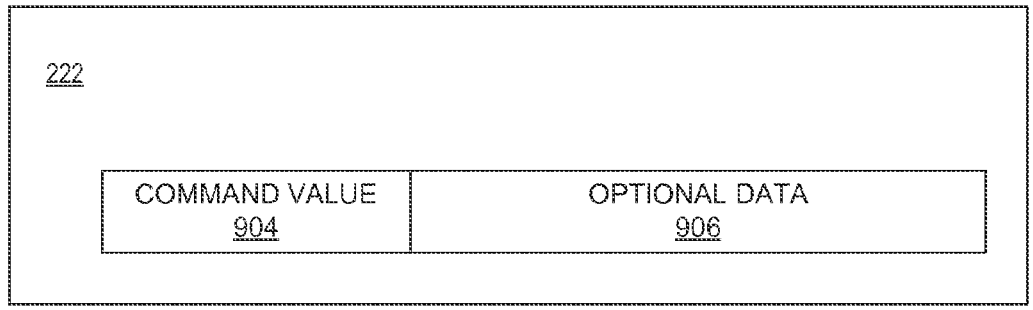
FIG. 9 illustrates various aspects of an appliance software protocol according to one embodiment.
Figure 9:
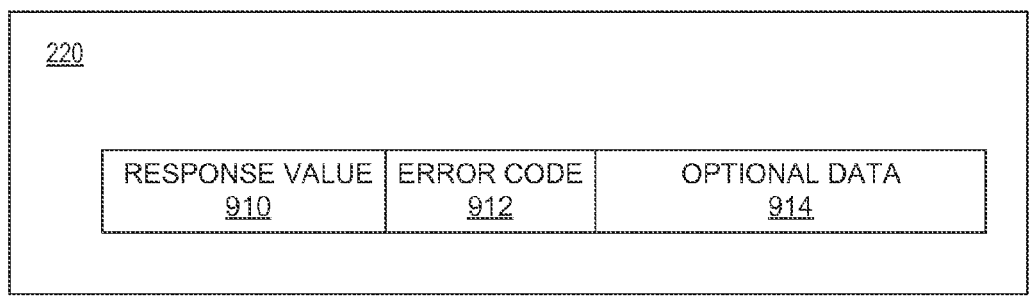
Figure 9:
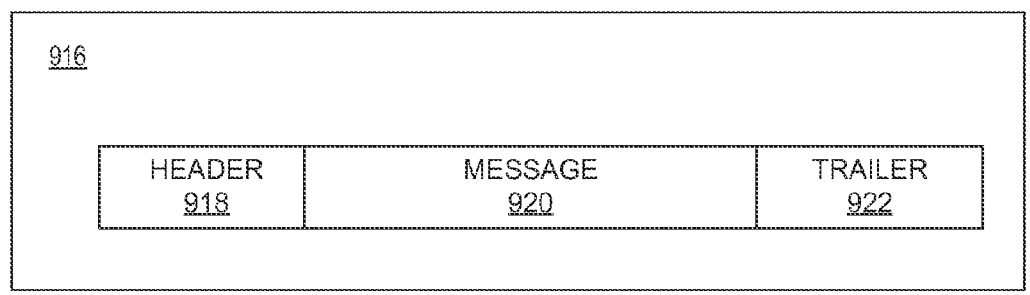

FIG. 9 depicts various aspects of an appliance software protocol according to one embodiment.

The abilities described herein with respect to communication between the interface device 204 and the appliance 202 can be controlled by software running on the interface device 204 and the appliance 202. The software can be any suitable software. In one embodiment, the software is an appliance software protocol as described below.

The appliance software protocol can use a master/slave paradigm, where the interface device 204 is the master and the appliance 202 is the slave. The interface device 204 issues commands 222, to which the appliance 202 transmits a response 220. The appliance software protocol can be used with various types of appliance interfaces 208, such as asynchronous serial lines, inter-integrated circuit (I2C) busses, universal serial bus (USB) busses, and others.

In some embodiments, commands 222 and responses 220 can be encapsulated in other protocols (e.g., WiFi, LTE, BLE, ZigBee, etc.) and the appliance interface 208 can be a wired or wireless connection that communicates using WiFi, LTE, BLE, ZigBee, or others. In other words, the application software protocol can be agnostic with regards to the transport methodology used. In an embodiment, the application software protocol is used with serial communications and the appliance interface 208 includes a serial interface.

All commands 222 can consist of an 8 bit command value 904 followed by optional data 906. In some embodiments, a command value 904 is denoted by a hexadecimal value (e.g., 0x00, 0x3f, and others). In some embodiments, a first range of hexadecimal values can be reserved for standardized commands common to all appliances 202 and commands in a second range of hexadecimal values can be reserved for current and/or future appliance specific usage. The maximum size of a command 222 can be 255 bytes. Other ranges can be used. Commands can be identified by any other suitable command values other than an 8 bit command value, such as 16 bit command values, strings, or other identifiers. As used herein, certain values will be discussed in reference to hexadecimal values, but other suitable numeral systems can be used (e.g., binary, decimal, or others).

Responses 220 can consist of an 8 bit response value 910 followed by an error code 912 and up to 240 bytes of optional data 914. The response value 910 can be formed by setting the most significant bit of the command value 904. The error code 912 can indicate whether the command 222 was executed correctly and can indicate whether the optional data 914 is valid. A first error code 912 can indicate that no error occurred. The appliance 202 can be required to send a response 220 for every command 222 received. The maximum size of a response 220 can be 255 bytes. Other ranges can be used. Responses can be identified by any other suitable response values other than an 8 bit response value, such as 16 bit response values, strings, or other identifiers.

Commands 222 and responses 220 can be transmitted as a message 920. The message 920 can be encapsulated in a capsule 916 that includes a header 918 and a trailer 922. The capsule 916 can be transmitted over an asynchronous serial link. The serial format can include one start bit, 8 data bits, and 1 stop bit and no parity at 9600 baud. The appliance interface 208 can use 3.3 volt CMOS logic levels where a high level can be a mark and a low level can be a space.

The header 918 can include a data link escape (DLE) character, a start of header (SOH) character, and a sequence number. The trailer 922 can include a DLE character, an end of text (ETX) character, a checksum least significant bit (LSB), and a checksum most significant bit (MSB). A two-byte sequence of DLE and SOH can indicate the beginning of a frame. The two-byte sequence of DLE ETX can indicate the end of a frame. Any occurrences of a DLE byte within the data or checksum fields can be sent as a two-byte sequence of DLE DLE to ensure uniqueness of the beginning of frame and end of frame sequences.

The sequence number of the header 918 can start at a specific value (e.g., 0x00) and increment for each command 222 transmitted until it reaches a maximum value (e.g., 0xff), at which point it resets. If the appliance 202 receives two frames in a row with the same sequence number, the appliance 202 can know that the interface device 204 has resent a command 222 because it did not receive a response 220. The appliance 202 can then resend the last response 220 without executing the command 222 a second time.

In some embodiments, the first command 222 transmitted when the interface device 204 begins its initialization procedure 5000 can be a NOP command with a sequence number of 0x00. Upon receiving a NOP command with a sequence number of 0x00, the appliance 202 can set its next expected sequence number value and transmit a response 220 to the NOP command. Commands 222 other than a NOP that are sent with a sequence number of 0x00 can be ignored.

The trailer 922 can include synchronization and error detection information for the frame. The checksum can be the 16-bit (modulo 0x10000) sum of all bytes in the frame excluding the two-byte start and end sequences and any stuffed DLE bytes. Upon receipt, the checksum information can be compared with a calculated checksum to detect data transmission errors. If an appliance 202 detects a data transmission error, the appliance 202 can transmit a response 220 including an error code of Communications Error. If the interface device 204 detects a data transmission error, the interface device 204 can resend the command 222 with the same sequence number.

In some embodiments, the interface device 204 can start a response timer upon transmission of a command 222. If no response 220 is received within an expected time, the interface device 204 can resend the command 222 without advancing the sequence number.

As described herein, command values 904 and response values 910 can be used to identify particular commands 222 and responses 220, respectively. Unique command values 904 and response values 910 can be selected from any suitable ranges. In the case of 8-bit values, the command values 904 and response values 910 may be selected from the range including 0x00 through 0xFF. Any suitable hexadecimal value can be selected for any unique command value 904 or unique response value 910 disclosed herein. Any suitable hexadecimal values (or other values) can be used as identification values for other elements (e.g., error codes).

As used below, the term "unique," such as when used to describe a command value, a response value, or a ID, is indicative that the particular value is used to identify a single corresponding element, such as a single corresponding command, response, or other element. In other words a NOP command having a unique command value would not share the same command value 904 with the Get Value command or any other command, but may share the same command value 904 with other NOP commands. In some embodiments, the same value (e.g., a particular hexadecimal value) used as a unique command value to identify a particular command can be used as a unique response value to identify a related or unrelated response.

A command 222 that is a NOP command can have a unique command value 904. The NOP command can do nothing except elicit a response 220 from the appliance 202. The appliance 202 can issue a response 220 to the NOP command with a unique response value 910 and an error code 912.

A command 222 that is a Get Value command can have a unique command value 904 and can include optional data 906 that contains a value ID. The Get Value command can request the current value associated with the indicated value ID. The appliance 202 can issue a response 220 to the Get Value command with a unique response value 910, an error code 912 as applicable, and optional data 914 that contains the value associated with the indicated value ID.

A command 222 that is a Get Value Chunk command can have a unique command value 904 and can include optional data 906 that contains a value ID, a chunk size, and a chunk offset. The Get Value Chunk command can request a chunk of the current value associated with the indicated value ID starting at the chunk offset and having a size of the chunk size. The appliance 202 can issue a response 220 to the Get Value Chunk command with a unique response value 910, an error code 912 as applicable, and optional data 914 that contains the desired chunk of the value associated with the indicated value ID.

A command 222 that is a Get Values command can have a unique command value 904 and can include optional data 906 that contains several value IDs. The Get Values command can request the current values associated with the indicated value IDs. The appliance 202 can issue a response 220 to the Get Values command with a unique response value 910, an error code 912 as applicable, and optional data 914 that contains the values associated with the indicated value IDs. Any values that are string values must be NULL terminated. The list of several value IDs can include up to one binary blob value as the last value ID in the list.

A command 222 that is a Set Value command can have a unique command value 904 and can include optional data 906 that contains a value ID and a desired value. The Set Value command can set the value associated with the indicated value ID to the desired value. The appliance 202 can issue a response 220 to the Set Value command with a unique response value 910 and an error code 912 as applicable.

A command 222 that is a Set Value Chunk command can have a unique command value 904 and can include optional data 906 that contains a value ID, a chunk offset, and a desired value. The Set Value Chunk command can set a chunk of the current value associated with the indicated value ID to the desired value, starting at the chunk offset. The appliance 202 can issue a response 220 to the Set Value Chunk command with a unique response value 910 and an error code 912 as applicable. In some embodiments, a series of Set Value Chunk commands can be issued and the final command in the series can include a chunk offset having the MSB set. The appliance 202 may or may not wait until all Set Value Chunk commands are received before changing the value associated with the indicated value ID.

A command 222 that is a Set Values command can have a unique command value 904 and can include optional data 906 that contains multiple value IDs and a desired value for each of the multiple value IDs. The Set Values command can set the value associated with each of the indicated value ID to the respective desired value. The appliance 202 can issue a response 220 to the Set Values command with a unique response value 910 and an error code 912 as applicable. Any values that are string values must be NULL terminated. The list of several value IDs can include up to one binary blob value as the last value ID in the list.

In some embodiments, an appliance 202 can include LEDs that are controllable by the interface device 204. A command 222 that is a Set LED command can have a unique command value 904 and can include optional data 906 that contains an LED ID and a red intensity, green intensity, blue intensity, and duration for one or more states. The Set LED command can set the LED (color and intensity) for a desired LED. The LED can cycle through each state, remaining in each state for a desired duration (e.g., in milliseconds). In an embodiment, a duration of 0x00 can indicate a loop back to the first state and a duration of 0xffff can indicate the LED remains in that state until a new Set LED command is received for that LED ID. The appliance 202 can issue a response 220 to the Set LED command with a unique response value 910 and an error code 912 as applicable. The red intensity, green intensity, and blue intensity can be provided as values in the range of 0x00 for off to 0xff for full intensity. Other colors can be used. An appliance 202 with different color LEDs or a monochromatic LED can interpret the various color intensities as desired. The appliance 202 can include an LED with an ID of 0 that can display the overall interface device 204 status and an LED with an ID of 1 to display the on/off status of the appliance 202. If the appliance 202 does not have an LED with an ID of 0, it can use the LED 1 line 318 to display the overall interface device 204 status in the interface device user interface extension 412 and can responds to a SET LED command for LED ID 0 with an Invalid Argument error code.

A command 222 that is a Get Buttons command can have a unique command value 904. The Get Buttons command can request the current state of all buttons on the device, including physical and pseudo buttons. The appliance 202 can issue a response 220 to the Get Buttons command with a unique response value 910, an error code 912 as applicable, and a list of buttons. The list of buttons contains an ID for each button, where the most significant bit is set if the button is pressed and cleared if the button is not pressed.

In some embodiments, button IDs from a first value (e.g., a first hexadecimal value) to a second value (e.g., a second hexadecimal value) are available for physical buttons and IDs from a third value (e.g., a third hexadecimal value) to a fourth value (e.g., a fourth hexadecimal value) are available for pseudo buttons. A first unique button ID can be associated with a Factory Restore pseudo button that can be used to restore the interface device 204 to factory defaults, such as if the appliance 202 is powered on while holding down a specific combination of physical buttons. The appliance 202 can detect such an event and set the most significant bit for the Factory Restore pseudo button ID.

A second unique button ID can be a settings changed pseudo button that can indicate that settings have been changed on the appliance 202 (e.g., changed by a user interacting with the user interface 408 of the appliance 202) and that the interface device 204 should refresh the values of any value having a poll rate attribute of 0xffff, as described in further detail below. The appliance 202 can detect when its settings have changed and can set the most significant but for the settings changed pseudo button ID.

A command 222 that is a Get Presses command can have a unique command value 904. The Get Presses command can request a list of all buttons that have changed state since the previous Get Presses or Get Buttons command. The appliance 202 can issue a response 220 to the Get Presses command with a unique response value 910, an error code 912 as applicable, and a list of changed buttons. The list of changed buttons contains an ID for each button that has changed since the previous Get Presses or Get Buttons command, where the most significant bit is set if the button has been pressed and cleared if the button has been released. If a button has been pressed and/or released more than once since the last Get Presses or Get Buttons command, the list of changed buttons can include a byte for each transition of the button. The appliance 202 can debounce any button presses prior to sending the button presses to the interface device 204.

A command 222 that is a Self-Test command can have a unique command value 904. The Self-Test command can return the results of the appliance's 202 self-test. The appliance 202 can issue a response 220 to the Self-Test command with a unique response value 910, an error code 912 as applicable, a test result code, and optional additional data. The test result code can be 0 if the self-test was successful, 1 if a minor error was detected, or 2 if a major error was detected. Upon receiving the test result code, the interface device 204 can determine whether or not to preclude operation of the appliance 202. If the interface device 204 receives a test result code that indicates an error, such as a minor error or a major error, the interface device 204 can preclude operation of the appliance 202. The additional data can include information describing the failures.

A command 222 that is a Get Attributes command can have a unique command value 904 and a value ID. The Get Attributes command can request the attributes associated with the indicated value ID. The appliance 202 can issue a response 220 to the Get Attributes command with a unique response value 910, an error code 912 as applicable, a type category, a usage category, a minimum value, a maximum value, and name. For values having a usage category in a first range (e.g., between a first value and a second value), as described in further detail below, the response 220 can further include a poll rate. For values having a usage category in a second range (e.g., between a third value and a fourth value), as described in further detail below, the response 220 can further include a tracked value ID and one or more tracking flags.

Type categories define what type of value is associated with a particular value ID, such as whether the value is a number, a string, or other. Table 1 includes possible type categories for a value. There may be more or fewer type categories. Each type category can be referred to by an identification number in the interface device 204 and appliance 202.

TABLE 1

| Type Category | Value Form and Size | Type Description |
| --- | --- | --- |
| Mode Enumeration | unsigned 8 bit integer, 1 byte | A Mode Enumeration value can be used to control or monitor an appliance's state where the state can be in one of N modes. The range can be from zero to the maximum value attribute. The minimum value attribute can be ignored. Values of this type can support a get enumerated attributes command. The minimum and maximum values can be specified as 32 bit unsigned integers. |
| Percent of Full | Unsigned 16 bit integer, 2 bytes | A Percent of Full value can be used to control or monitor a value between 0.0% and 100.0%, such as in .1% steps. The appliance can be responsible for updating the value as the actual appliance setting changes. This value type is appropriate for controlling elements of an appliance that are adjusted on a relative scale from zero to full, such as lighting levels, volume, fan speed, or others. |
| Temperature | Signed 16 bit integer, 2 bytes | A Temperature value can be used to indicate temperature, such as in ° Fahrenheit. In an embodiment, the Temperature value can range from −3276.8° F. to +3276.7° F. in .1° steps. The Temperature range can be limited by minimum and maximum value attributes. |
| First Time | Signed 32 bit integer, 4 bytes | A First Time value can indicate the number of seconds, such as in .1 second steps. The range can be more than ±6 years or can be limited by minimum and maximum value attributes. |
| Second Time | Unsigned 16 bit integer, 2 bytes | A Second Time value can indicate the number of seconds, such as in 1 second steps. The range can be from 0 to 65535 seconds (18 hours, 12 minutes and 15 seconds) or can be limited by minimum and maximum value attributes. |
| Third Time | Binary Code Decimal, 3 bytes | A Third Time value can indicate a number of hours, minutes, and seconds encoded in a binary code decimal (BCD) format. Each of the three bytes can be one of the number of seconds, minutes, and hours. The time can be in 24 hour format. |
| Boolean | Unsigned 8 bit integer | A Boolean value can be used to control or monitor a device state that can be either on (1) or off (0). Any maximum value attribute or minimum value attribute can be ignored. |
| Date | BCD, 4 bytes | A Date value can include a day, month, and year encoded in BCD format. Each of the four bytes can be one of the day, the month, the least significant 2 digits of the year, and the most significant 2 digits of the year. |
| Date/Time | BCD, 7 bytes | A Date/Time value can include the date and time encoded in BCD format as described above with reference to the Third Time value and the Date value. |
| String | 1 or more bytes | A String value can include a string of characters, such as English language ASCII characters or other language characters. The minimum value attribute and maximum value attribute can define the limits of the string length. The minimum value attribute and maximum value attribute can be specified as 32 bit unsigned integers. |

TABLE 1-continued

| Type Category | Value Form and Size | Type Description |
|---|---|---|
| Binary Blob | 1 or more bytes | A Binary Blob value can include any amount of binary data. Generally, data in a binary blob only has meaning to the appliance 202 itself. The Binary Blob value can be used to provide firmware updates to the appliance 202 or for other appliance-specific purposes. The minimum value attribute and maximum value attribute can define the limits of the binary blob length. The minimum value attribute and maximum value attribute can be specified as 32 bit unsigned integers. |
| Uint8 | 1 byte | Unsigned 8 bit integer |
| Int8 | 1 byte | Signed 8 bit integer |
| Uint16 | 2 bytes | Unsigned 16 bit integer |
| Int16 | 2 bytes | Signed 16 bit integer |
| Uint32 | 4 bytes | Unsigned 32 bit integer |
| Int32 | 4 bytes | Signed 32 bit integer |
| Fourth Time | Unsigned 16 bit integer, 2 bytes | A Fourth Time value can indicate the number of minutes, such as in 1 minute steps. The range can be from 0 to 65535 minutes (45 days, 12 hours and 15 minutes) or can be limited by minimum and maximum value attributes. |

The value have an associated usage category. Usage categories define how a value can be used, such as whether it is a setting of the appliance or a readable value (e.g., sensed ambient temperature). Table 2 includes possible usage categories for a value. There may be more or fewer usage categories. Each usage category can be referred to by an identification number in the interface device 204 and appliance 202.

TABLE 2

| Usage Category | Usage Description |
|---|---|
| Fixed | A value with a Fixed usage category represents a value of the appliance 202 that does not vary over time. Such a Fixed value can be read once by the interface device 204 during the initialization procedure 500. Fixed values may be never written by the interface device 204. Examples of a Fixed value include a model number or a serial number. |
| Monitored | A value with a Monitored usage category represents a value of the device that can vary over time (e.g., a variable), but it not directly controllable. A Monitored value can be read periodically by the interface device 204 at a rate based on a poll rate attribute. Monitored values may be never written by the interface device 204. Examples of a Monitored value include a sensed ambient temperature. |
| Desired | A value with a Desired usage category represents a value that is desired for another value of the appliance 202 having the same type category as the Desired value. For example, a Desired value can indicate a desired temperature for a crock pot (e.g., 150° F.) and a Monitored value can indicate the actual temperature of the crock pot (e.g., 120° F.). The interface device 204 and/or appliance 202 can compare the Desired value and Monitored value to determine what action to take (e.g., heat the crock pot). The interface device 204 can modify a Desired value (e.g., changing 150° F. to 100° F.) which can end up changing what action is taken by the appliance 202 (e.g., stop heating the crock pot). In some embodiments, a Desired value is modifiable only by the interface device 204. In other embodiments, the Desired value can be modified by the appliance 202, such as through user input or internal programming, and in such embodiments that Desired value should have a non-zero poll rate attribute so that the interface device 204 will periodically check the value of the Desired value. |
| Controlled | A value with a Controlled usage category represents a value that can be directly controlled, such as turning the appliance "off." The interface device 204 can modify a Controlled value. In some embodiments, a Controlled value is modifiable only by the interface device 204. In other embodiments, the Controlled value can be modified by the appliance 202, such as through user input or internal programming, and in such embodiments that Controlled value should have a non-zero poll rate attribute so that the interface device 204 will periodically check the value of the Controlled value. Examples of a Controlled value can include a "start" button or a "heat on" command. |
| Minimum value pseudo variable | A value that is a minimum value pseudo variable can be defined by the appliance to track the minimum value of a corresponding appliance value while it is within the range defined by the minimum value pseudo variable's minimum value attribute and maximum value attribute. The time when the minimum value occurred can be saved along with the minimum value. As an example, an appliance can track a minimum value pseudo variable for another value that is a sensed temperature value, so that as long as the |

TABLE 2-continued

| Usage Category | Usage Description |
|---|---|
| | sensed temperature value is within the range defined by the minimum value pseudo variable's minimum value attribute and maximum value attribute, the minimum value pseudo variable will contain the lowest temperature sensed and the time that the lowest temperature was sensed. |
| Maximum value pseudo variable | A value that is a maximum value pseudo variable can be defined by the appliance to track the maximum value of a corresponding appliance value while it is within the range defined by the maximum value pseudo variable's minimum value attribute and maximum value attribute. The time when the maximum value occurred can be saved along with the maximum value. As an example, an appliance can track a maximum value pseudo variable for another value that is a sensed temperature value, so that as long as the sensed temperature value is within the range defined by the maximum value pseudo variable's minimum value attribute and maximum value attribute, the maximum value pseudo variable will contain the highest temperature sensed and the time that the highest temperature was sensed. |
| Range entry pseudo variable | A value that is a range entry pseudo variable can be defined by the appliance to track the value of and time when a corresponding appliance value enters a particular range defined by the range entry pseudo variable's minimum value attribute and maximum value attribute. As an example, an appliance can track a range entry pseudo variable for another value that is a sensed temperature value. The first time the sensed temperature value enters the range defined by the range entry pseudo variable's minimum value attribute and maximum value attribute, the range entry pseudo variable will contain the temperature sensed and the time that the temperature was sensed. |
| Range exit pseudo variable | A value that is a range exit pseudo variable can be defined by the appliance to track the value of and time when a corresponding appliance value exits a particular range defined by the range exit pseudo variable's minimum value attribute and maximum value attribute. As an example, an appliance can track a range exit pseudo variable for another value that is a sensed temperature value. The first time the sensed temperature value exits the range defined by the range entry pseudo variable's minimum value attribute and maximum value attribute, the range exit pseudo variable will contain the temperature sensed and the time that the temperature was sensed. |

The minimum value attribute can be the minimum value that the value associated with the value ID can have. The maximum value attribute can be the maximum value that the value associated with the value ID can have. The name attribute can be an ASCII text name associated with the value ID.

The poll rate attribute can be present for any suitable value. In some embodiments, the poll rate attribute is not present for pseudo variables. Table 3 includes possible poll rates for a value. There may be more or fewer poll rates. Each poll rate can be referred to by an identification number in the interface device 204 and appliance 202. Unique identification numbers for the Not Polled, Asynchronous Transmission, and Polled on Notification polling rates can be reserved as three separate identification numbers. The generic Poll Rate polling rates can include a range of identification numbers (e.g., the remainder of identification numbers) that are used to delineate a range of polling rates.

TABLE 3

| Brief Description | Poll Rate Description |
|---|---|
| Not Polled | Values with a Not Polled poll rate attribute never change or are only changed by the interface device 204, and therefore never need to be polled. |
| Poll Rate | Values with a poll rate attribute having a poll rate in a specified range (e.g., a particular identification number within a range of possible identification numbers) can delineate the suggested polling rate, such as in milliseconds from 0.001 second to 65.28 seconds. |
| Asynchronous Transmission | Values with an Asynchronous Transmission poll rate attribute can be read by the interface device 204 asynchronously as desired. |

TABLE 3-continued

| Brief Description | Poll Rate Description |
|---|---|
| Polled on notification | Values with a Polled on Notification poll rate attribute can be ready by the interface device 204 during the initialization procedure 500 and upon notification from the appliance 202. The appliance 202 can notify the interface device 204 by passing a pseudo button event, as described in further detail herein. |

A tracking value ID is the value ID of the value that the pseudo variable is monitoring. A tracking flag indicates how the pseudo variable responds to changes in the tracked value ID. A tracking flag set to a first value can indicate a Save tacking flag, where when the corresponding trigger condition is met, the event is saved into nonvolatile memory in the interface device 204. A tracking flag set to a second value can indicate a Push/Important tracking flag, where when the corresponding trigger condition is met, the event is considered important and the interface device 204 should attempt to notify the user of the important event as soon as possible (e.g., by a push notification, message on the access device 108, or other way).

A command 222 that is a Get Enumerated Attributes command can have a unique command value 904, a value ID, and an enumerated value ID. The Get Enumerated Attributes command can request the name for the indicated enumerated value ID for the indicated value ID. The appliance 202 can issue a response 220 to the Get Enumerated Attributes command with a unique response value 910, an error code 912 as applicable, and a name for the indicated enumerated value ID for the indicated value ID. The name can be a string of up to 32 bytes. For example, a value that is a Mode Enumerated value can have three settings, the first of which is "Low," the second of which is "Medium," and the third of which is "High."

A command 222 that is a Get Link Rate command can have a unique command value 904. The Get Link Rate command can request the available link rates supported by the appliance 202. The appliance 202 can issue a response 220 to the Get Link Rate command with a unique response value 910, an error code 912 as applicable, and one or more link rates. Each of the link rates can be sent as an unsigned 32 bit integer with the least significant byte first.

A command 222 that is a Set Link Rate command can have a unique command value 904 and a new link rate. The Set Link Rate command can set the link rate of the appliance 202 to the new link rate. The appliance 202 can update its link rate and issue a response 220 to the Set Link Rate command with a unique response value 910, and an error code 912 as applicable.

A command 222 that is an Asynchronous Enable command can have a unique command value 904 and a Boolean enable value. The Asynchronous Enable command can enable or disable asynchronous reporting of values with a poll rate attribute of a particular value, as described above. The appliance 202 can issue a response 220 to the Asynchronous Enable command with a unique response value 910, and an error code 912 as applicable.

A command 222 that is an Asynchronous Data command can have a unique command value 904 and a value ID. The Asynchronous Data command can read the value of a value ID having a specific poll rate attribute as described above. The appliance 202 can issue a response 220 to the Asynchronous Data command with a unique response value 910, an error code 912 as applicable, a value ID, and the value associated with the value ID.

In instances where the appliance 202 needs to return data that exceeds the maximum available size of a message 920, then truncated data can be sent in a response 220 along with an error code of More Data. Upon receiving a response 220 with an error code of More Data, the interface device 204 can send a Get More command to receive the additional data.

In some embodiments, the appliance 202 can include a standard set of values. The standard set of values can include an appliance ID, an appliance firmware version, an appliance description, an interface device status, an overall state, a supported software protocol version, and a clock time.

An appliance ID can be associated with a particular value ID, can be a 32 bit unsigned integer, can be a Uint32 type category, and can be read only. The appliance ID can be a unique identification number that can be read by the interface device 204 and compared with a memory on the interface device 204 or information stored in the cloud network 114 to determine recognize the appliance 202.

An appliance firmware version can be associated with a particular value ID, can be a string type category, and can be read only. The appliance firmware version can be human readable (e.g. V1.00) and can be passed to a user for the user to identify the firmware of the appliance 202.

An appliance description can be associated with a particular value ID, can be a string type category, and can be ready only. The appliance description can be human readable and can be passed to a user for the user to identify information about the appliance 202.

An interface device status can be associated with a particular value ID, can be a mode enumeration value, and can be write only (e.g., only writable by the interface device, not the appliance 202). The interface device status can have values including: Off, Startup/Connecting, Connection Established, On & OK, Poor Connection, No connection (or connection not usable), Setup Mode, Firmware Update. The interface device status information can be read by the appliance 202 and used as desired.

An overall state can be associated with a particular value ID and can be a mode enumeration value. The overall state can have values including: Off, Standby, and On. The overall state can be read by the appliance 202 and used to turn on the appliance 202, turn off the appliance 202, or set the appliance 202 to standby.

A supported software protocol version can be associated with a particular value ID, can be a string type category, and can be read only. The supported software protocol version can indicate the latest software protocol version supported by the appliance 202. The interface device 204 can read the supported software protocol version to ensure it uses the proper software protocol version to communicate with the appliance 202.

A clock time can be associated with a particular value ID and can be a 7 byte BCD time/date type category value. The clock time can be set by the interface device 204. If the appliance 202 includes real time clock hardware, the interface device 204 can request the clock time from the appliance 202.

In some embodiments, various error codes 912 can be sent with a response 220. Error codes 912 can include an error code ID and an optional error code string. Error codes 912 having an error code ID in a first range (e.g., a first hexadecimal number to a second hexadecimal number) can be available for all appliances 202, while error codes 912 having an error code ID in a second range (e.g., a third hexadecimal number to a fourth hexadecimal number) can be reserved for current or future device specific usage. The error code string can include additional information about the error. The interface device 204 can pass to the user any error code strings that begin with a "!". Table 4 includes a list of possible error codes 912, each of which can have a unique error code ID.

TABLE 4

| Brief Description | Error Code Description |
| --- | --- |
| No Error | The command 222 was processed successfully. |
| Invalid Command | The command 222 was received successfully, but is not supported by the appliance 202. |
| Invalid Argument | The command 222 was received successfully, but the command argument was invalid. |
| Not Permitted | The command 222 was received successfully, but the requested action is not permitted currently. This error code 912 can indicate that the appliance state does not allow the requested action (e.g., local override, safety hazard, or other). |
| Communications Error | A command 222 was received, but the message did not pass the error check (e.g., a checksum or CRC error was detected). |
| More Data | The response 220 contains incomplete information, but is otherwise correct. This error code 912 can indicate that the maximum message size constraint prevented the requested information from being returned completely, or that the device has elected to return the requested information in multiple messages. |
| Data Overflow | The response 220 contains incomplete information, but is otherwise correct. The appliance 202 had insufficient memory to buffer real time events (e.g., button presses) before being polled for the information by the interface device 204. |
| Internal Error | The appliance 202 was unable to execute the command 222 due to an internal failure. |

TABLE 4-continued

| Brief Description | Error Code Description |
|---|---|
| No Data | The appliance 202 is unable to return the requested data. The data maybe available at a later time. |

Various embodiments of the software described above can be implemented as an appliance serial protocol that is a computer-implemented method. The method can include initializing an interface device having a network interface and a serial appliance interface. Initializing can include determining when an appliance connected to the serial appliance interface is ready. Initializing can further include obtaining, using the serial appliance interface, a type category and a usage category associated with one or more value identification numbers related to respective functions of the appliance. Initializing can further include storing the type category and usage category as value attributes in a database. In addition to initializing the interface device, the method can also include obtaining a current value associated with one of the one or more value identification numbers by transmitting a get value command specifying the one of the one or more value identification numbers and receiving the current value.

In an embodiment, initializing the interface device can also include transmitting a software protocol version request using the serial appliance interface, receiving an appliance software protocol version using the serial appliance interface, and updating the interface device to communicate using the serial appliance interface based on the appliance software protocol version.

In an embodiment, obtaining the type category and the usage category can also include transmitting a first get attributes command that indicates a first value identification number, receiving a response to the first get attributes command that contains a received type category and a received usage category that are related to the first value identification number, and storing the received type category and the received usage category in the database. Obtaining the type category and the usage category can further include sending a subsequent get attributes command that indicates a subsequent value identification number. Obtaining the type category and the usage category can further include updating the database to indicate that the subsequent value identification number is inaccessible when an invalid argument error is received.

In an embodiment, the received type category can be a mode enumerated type, a percent full type, a temperature type, a time type, a Boolean type, a date type, a date and time type, a string, and a binary blob type. The received usage category can be a fixed value, a monitored value, a desired value, a controlled value, a minimum value pseudo variable, a maximum value pseudo variable, a range entry pseudo variable, and a range exit pseudo variable.

In some embodiments, initializing the interface device can also include obtaining a list of names associated with each of the one or more value identification numbers that is a mode enumerated type. Obtaining the list of names can include transmitting a get enumerated attributes command including respective one or more value identification numbers, using the serial appliance interface, and receiving a name, using the serial appliance interface, associated with the respective one or more value identification numbers. Each name can be used a label for a setting or condition of a feature of the appliance. For example, possible settings for a value related to the temperature of an appliance can have names "low," "medium," and "high."

In some embodiments, initializing the interface device can also include transmitting, at an original link rate, a maximum link rate request using the serial appliance interface and receiving a maximum link rate value using the serial appliance interface. Initializing the interface device can further include adjusting the serial appliance interface to a new link rate based on the maximum link rate value by transmitting a set link rate command, using the serial appliance interface, based on the new link rate, transmitting a no action command using the serial appliance interface at the new link rate, and reverting to the original link rate when no valid no action response is received at the new link rate after a predetermined period of time.

In some embodiments, in addition to initializing the interface device and obtaining the current value associated with one of the one or more value identification numbers, the method can also include setting a controllable value that is associated with another of the one or more value identification numbers by transmitting, using the serial appliance interface, a set value command including the another of the one or more value identification numbers.

In some the computer-implemented method can also include transmitting an appliance self-test command using the serial appliance interface and receiving a self-test result selected from the group consisting of a successful result, a minor error result, a major error result, and a no test performed result.

In some embodiment, obtaining the type category and the usage category can further include transmitting, for each of the one or more value identification numbers, a get attributes command specifying the respective value identification number and receiving, for each of the one or more value identification numbers, an attribute response associated with the respective one or more value identification numbers, wherein the attribute response includes at least one selected from the group consisting of a polling rate and a name. In some embodiments, the attribute response can include a trigger condition as well as a tracking flag that indicates that a report is to be sent or saved when the interface device determines that the trigger condition is met.

Figure 10:
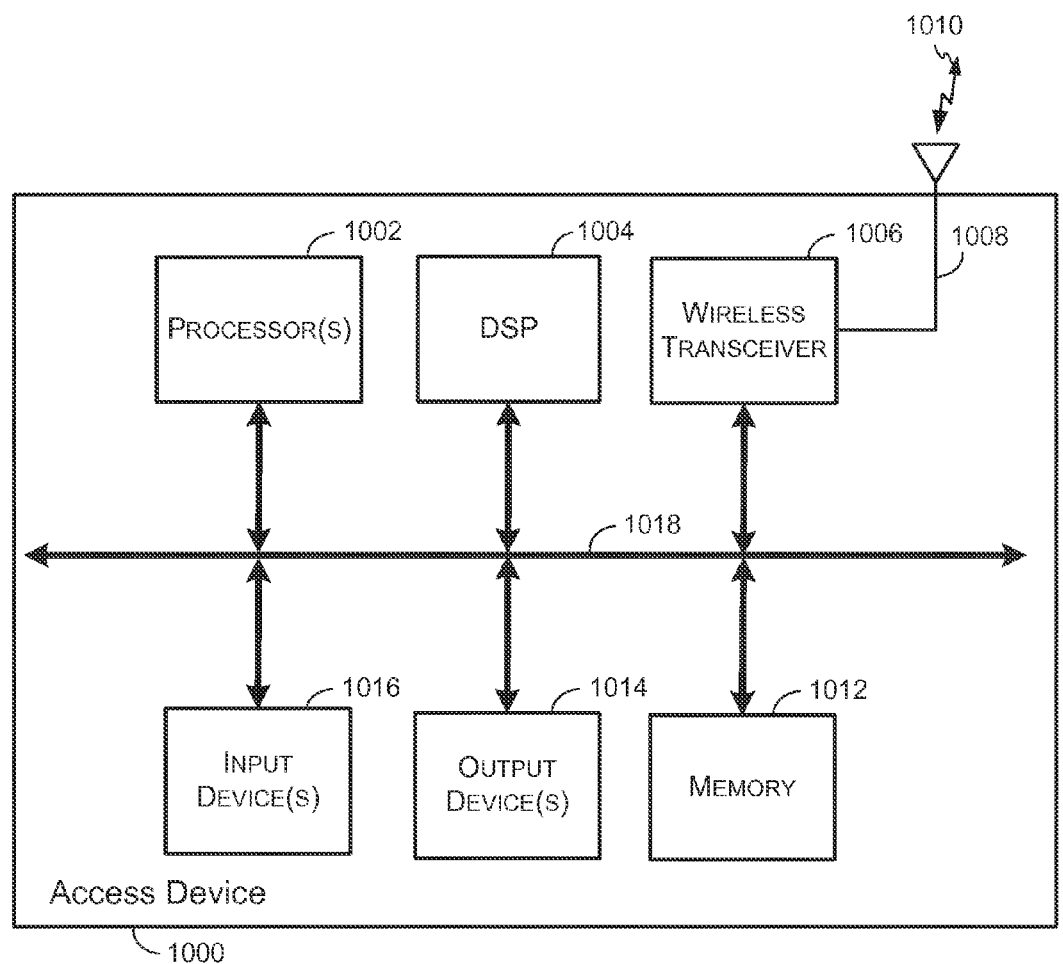
FIG. 10 illustrates an example of an access device according to one embodiment.

FIG. 10 illustrates an example of an access device 1000 according to one embodiment. The access device 1000 may include any human-to-machine interface with network connection capability that allows access to a network. For example, the access device 1000 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1000 includes hardware elements that can be electrically coupled via a bus 1018 (or may otherwise be in communication, as appropriate). In one embodiment, the bus 1018 can be used for the processor(s) 1002 to communicate between cores and/or with the memory 1012. The hardware elements may include one or more processors 1002, including without limitation one or more general-purpose processors and/or one or more special-purpose processors (such as digital signal processing chips, graphics acceleration processors, and/or the like); one or more input devices 1016, which can include without limitation a camera, a mouse, a keyboard, a touch sensitive screen, a touch pad, a keypad, and/or the like; and one or more output devices 1014, which can include, without limitation, a display, a printer, and/or the like.

The access device 1000 may include one or more wireless transceivers 1006 connected to the bus 1018. The wireless transceiver 1006 may be operable to receive a wireless signal 1010 via antenna 1008. The wireless signal 1010 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1006 may be configured to receive various radio frequency (RF) signals 1010 via antenna 1008 from one or more gateways, network devices, cloud networks, and/or the like. Access device 1000 may also be configured to decode and/or decrypt, via the DSP 1004 and/or processor(s) 1002, various signals received from one or more gateways, network devices, cloud networks, and/or the like.

The access device 1000 may further include (and/or be in communication with) one or more non-transitory storage devices (e.g., memory 1012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1012, such as on a computer-readable storage medium, such as RAM, ROM, FLASH, or disc drive, and executed by processor(s) 1002 or DSP 1004. The access device 1000 can also comprise software elements (e.g., located within the memory 1012), including, for example, an operating system, device drivers, executable libraries, and/or other code, such as one or more application programs, which may comprise computer programs implementing various functions Memory 1012 may be a processor-readable memory and/or a computer-readable memory that stores software code (programming code, instructions, etc.) configured to cause the processor(s) 1002 and/or DSP 1004 to perform the various functions. In other embodiments, the various functions described may be performed in hardware.

Figure 11:
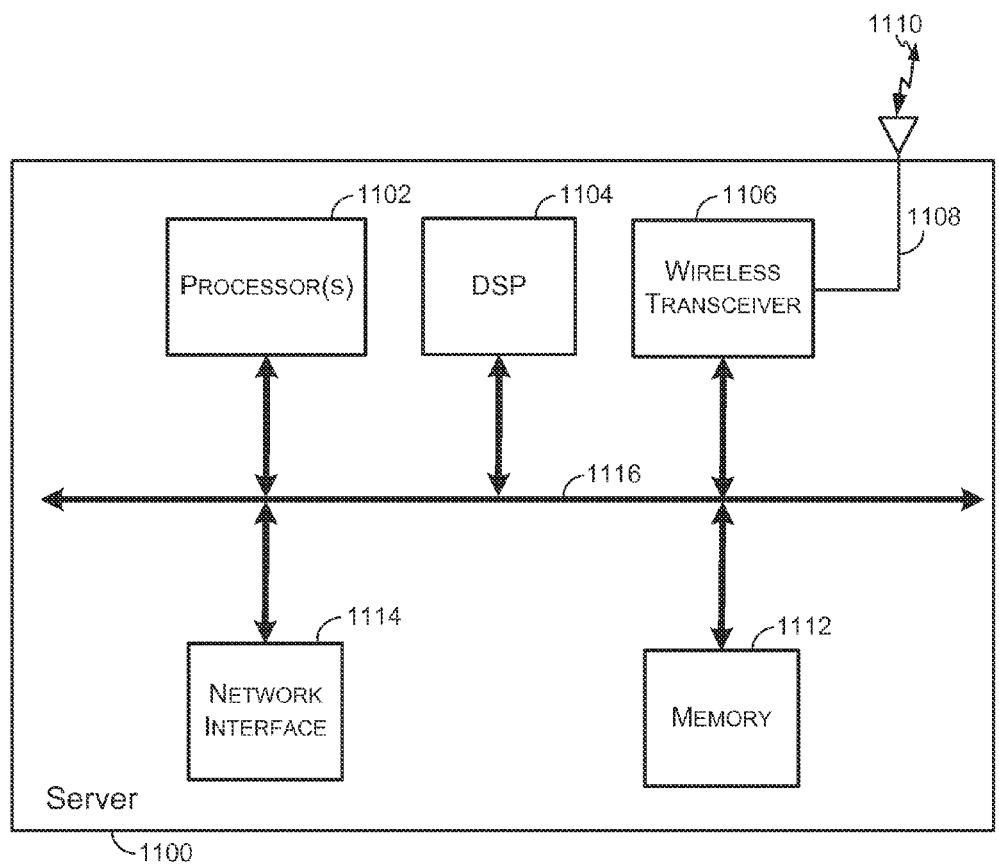
FIG. 11 illustrates an example of a server according to one embodiment.

FIG. 11 illustrates an example of a server 1100 according to one embodiment. The server 1100 includes hardware elements that can be electrically coupled via a bus 1116 (or may otherwise be in communication, as appropriate). In one embodiment, the bus 1116 can be used for the processor(s) 1102 to communicate between cores and/or with the memory 1112. The hardware elements may include one or more processors 1102, including without limitation one or more general-purpose processors and/or one or more special-purpose processors (such as digital signal processing chips, graphics acceleration processors, and/or the like), memory 1112, DSP 1104, a wireless transceiver 1106, a bus 1116, and antenna 1108. Furthermore, in addition to the wireless transceiver 1106, server 1100 can further include a network interface 1114 to communicate with a network (e.g., a local area network, a network of a preferred carrier, Internet, etc.).

The server 1100 may further include (and/or be in communication with) one or more non-transitory storage devices (e.g., memory 1112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1112. The server 1100 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform various steps described above. The memory 1112 may be a processor-readable memory and/or a computer-readable memory that stores software code (programming code, instructions, etc.) configured to cause the processor(s) 1102 to perform the functions described. In other embodiments, one or more of the functions described may be performed in hardware.

A set of these instructions and/or code might be stored on a computer-readable storage medium, such as the memory 1112. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 1100 and/or might take the form of source and/or installable code, which, upon compilation and/or installation on the server 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving power at an interface device having a network interface and an appliance interface, wherein the appliance interface is couplable to an appliance for receiving appliance capability information specific to the appliance, wherein the appliance capability information identifies one or more attributes associated with a set of values, wherein a set of values includes one or more values, wherein an attribute is indicative of a type category or a usage category of a value, wherein a type category is indicative of a format of a value and a usage category is indicative of how the interface device can interact with a value, wherein a value of the set of values corresponds to an activity performable by the appliance;
   transmitting an initial attribute request for an attribute associated with a value of the set of values, wherein transmitting includes using the appliance interface;
   receiving an attribute response and transmitting a subsequent attribute request for one or more additional attributes associated with values in the set of values;
   receiving a final attribute response, wherein the final attribute response indicates a last value in the set of values;
   determining network device capability information, wherein the network device capability information corresponds to the appliance capability information; and
   transmitting the network device capability information using the network interface, wherein when the network device capability information is received, the network device capability information facilitates generation of a graphical interface for interfacing with the activity performable by the appliance.

2. The method of claim 1, further comprising:
   transmitting an update request through the appliance interface, wherein the update request corresponds to the value of the set of values corresponding to the activity performable by the appliance, and wherein the value of the set of values corresponding to the activity performable by the appliance is a readable value corresponding to a condition of the appliance;
   receiving an updated status for the readable value; and
   transmitting a status update through the network interface, wherein the status update corresponds to the updated status for the readable value.

3. The method of claim 1, further comprising:
   receiving appliance identification information using the appliance interface and at least one of the one or more attributes associated with the set of values; and
   transmitting the appliance identification information through the network interface.

4. The method of claim 1, wherein receiving power at the interface device includes receiving power from the appliance.

5. The method of claim 1, wherein the appliance interface is a serial interface.

6. The method of claim 1, further comprising:
   receiving a network device control signal through the network interface, wherein the network device control signal is associated with the value of the set of values corresponding to the activity performable by the appliance, wherein the value of the set of values corresponding to the activity performable by the appliance is a controllable value corresponding to a setting of the appliance, and wherein the appliance capability information further identifies a control scheme for the controllable value; and
   transmitting an appliance control signal through the appliance interface, wherein the appliance control signal updates the controllable value, and wherein the appliance control signal corresponds to the network device control signal.

7. A system, comprising:
   one or more data processors of an interface device having a network interface and an appliance interface, wherein the appliance interface is couplable to an appliance for receiving appliance capability information specific to the appliance, wherein the appliance capability information identifies one or more attributes associated with a set of values, wherein a set of values includes one or more values, wherein an attribute is indicative of a type category or a usage category of a value, wherein a type category is indicative of a format of a value and a usage category is indicative of how the interface device can interact with a value, wherein a value of the set of values corresponds to an activity performable by the appliance; and
   a non-transitory computer-readable storage medium containing instructions which when executed on the one or more data processors, cause the one or more data processors to perform operations including:
      transmitting an initial attribute request for an attribute associated with a value of the set of values, wherein transmitting includes using the appliance interface;
      receiving an attribute response and transmitting a subsequent attribute request for one or more additional attributes associated with values in the set of values;
      receiving a final attribute response, wherein the final attribute response indicates a last value in the set of values;

determining network device capability information, wherein the network device capability information corresponds to the appliance capability information; and transmitting the network device capability information using the network interface, wherein when the network device capability information is received, the network device capability information facilitates generation of a graphical interface for interfacing with the activity performable by the appliance.

8. The system of claim 7, wherein the operations further include:

transmitting an update request through the appliance interface, wherein the update request corresponds to the value of the set of values corresponding to the activity performable by the appliance, and wherein the value of the set of values corresponding to the activity performable by the appliance is a readable value corresponding to a condition of the appliance;

receiving an updated status for the readable value; and transmitting a status update through the network interface, wherein the status update corresponds to the updated status for the readable value.

9. The system of claim 7, wherein the operations further include:

receiving appliance identification information using the appliance interface and at least one of the one or more attributes associated with the set of values; and transmitting the appliance identification information through the network interface.

10. The system of claim 7, wherein power for the one or more data processors is supplied from the appliance.

11. The system of claim 7, wherein the appliance interface is a serial interface.

12. The system of claim 7, wherein the operations further include:

receiving a network device control signal through the network interface, wherein the network device control signal is associated with the value of the set of values corresponding to the activity performable by the appliance, wherein the value of the set of values corresponding to the activity performable by the appliance is a controllable value corresponding to a setting of the appliance, and wherein the appliance capability information further identifies a control scheme for the controllable value; and transmitting an appliance control signal through the appliance interface, wherein the appliance control signal updates the controllable value, and wherein the appliance control signal corresponds to the network device control signal.

13. A computer-program product tangibly embodied in a non-transitory machine-readable storage medium, including instructions configured to cause a data processing apparatus of an interface device to perform operations, the interface device having a network interface and an appliance interface, wherein the appliance interface is couplable to an appliance for receiving appliance capability information specific to the appliance, wherein the appliance capability information identifies one or more attributes associated with a set of values, wherein a set of values includes one or more values, wherein an attribute is indicative of a type category or a usage category of a value, wherein a type category is indicative of a format of a value and a usage category is indicative of how the interface device can interact with a value, wherein a value of the set of values corresponds to an activity performable by the appliance, wherein the operations include:

transmitting an initial attribute request for an attribute associated with a value of the set of values, wherein transmitting includes using the appliance interface;

receiving an attribute response and transmitting a subsequent attribute request for one or more additional attributes associated with values in the set of values;

receiving a final attribute response, wherein the final attribute response indicates a last value in the set of values;

determining network device capability information, wherein the network device capability information corresponds to the appliance capability information; and transmitting the network device capability information using the network interface, wherein when the network device capability information is received, the network device capability information facilitates generation of a graphical interface for interfacing with the activity performable by the appliance.

14. The computer-program product of claim 13, wherein the operations further include:

transmitting an update request through the appliance interface, wherein the update request corresponds to the value of the set of values corresponding to the activity performable by the appliance, and wherein the value of the set of values corresponding to the activity performable by the appliance is a readable value corresponding to a condition of the appliance;

receiving an updated status for the readable value; and transmitting a status update through the network interface, wherein the status update corresponds to the updated status for the readable value.

15. The computer-program product of claim 13, wherein the operations further include:

receiving appliance identification information using the appliance interface and at least one of the one or more attributes associated with the set of values; and transmitting appliance identification information through the network interface.

16. The computer-program product of claim 13, wherein power for the interface device is supplied from the appliance.

17. The computer-program product of claim 13, wherein the appliance interface is a serial interface.

18. The computer-program product of claim 13, wherein the operations further include:

receiving a network device control signal through the network interface, wherein the network device control signal is associated with the value of the set of values corresponding to the activity performable by the appliance, wherein the value of the set of values corresponding to the activity performable by the appliance is a controllable value corresponding to a setting of the appliance, and wherein the appliance capability information further identifies a control scheme for the controllable value; and transmitting an appliance control signal through the appliance interface, wherein the appliance control signal updates the controllable value, and wherein the appliance control signal corresponds to the network device control signal.

* * * * *